(12) United States Patent
Quek et al.

(10) Patent No.: US 8,504,932 B2
(45) Date of Patent: Aug. 6, 2013

(54) IMAGE COLLAGE BUILDER

(75) Inventors: Su Mien Quek, San Francisco, CA (US);
Patrick C. Teo, San Mateo, CA (US);
Peter Charles Elarde, Newark, CA (US)

(73) Assignee: Shutterfly, Inc., Redwood City, CA (US)

( * ) Notice: Subject to any disclaimer, the term of this patent is extended or adjusted under 35 U.S.C. 154(b) by 592 days.

(21) Appl. No.: 12/767,593

(22) Filed: Apr. 26, 2010

(65) Prior Publication Data

US 2010/0223568 A1 Sep. 2, 2010

Related U.S. Application Data

(63) Continuation of application No. 11/403,625, filed on Apr. 13, 2006, now abandoned.

(51) Int. Cl.
*G06F 3/00* (2006.01)
*G06F 3/048* (2013.01)

(52) U.S. Cl.
USPC ........... 715/769; 715/730; 715/748; 715/764; 715/788; 715/710

(58) Field of Classification Search
None
See application file for complete search history.

(56) References Cited

U.S. PATENT DOCUMENTS

| | | |
|---|---|---|
| 3,982,744 A | 9/1976 | Kraynak |
| 4,918,490 A | 4/1990 | Stemmle |
| 4,975,010 A | 12/1990 | Karolyi |
| 5,247,320 A | 9/1993 | Kay |
| 5,287,199 A | 2/1994 | Zoccolillo |
| 5,457,904 A | 10/1995 | Colvin |
| 5,519,499 A | 5/1996 | Saito |
| 5,533,175 A | 7/1996 | Lung |
| 5,587,740 A | 12/1996 | Brennan |
| 5,615,015 A | 3/1997 | Krist |
| 5,706,457 A | 1/1998 | Dwyer |
| 5,740,270 A | 4/1998 | Rutenberg |
| 5,740,497 A | 4/1998 | Yamada |
| 5,796,877 A * | 8/1998 | Gusmano ............... 382/298 |
| 5,867,282 A | 2/1999 | Fredlund |
| 5,903,728 A | 5/1999 | Semenzaro |
| 5,907,410 A | 5/1999 | Ohtake |
| 5,907,640 A | 5/1999 | Delean |
| 5,918,213 A | 6/1999 | Bernard |
| 5,926,288 A | 7/1999 | Dellert |
| 5,960,411 A | 9/1999 | Hartman |
| 5,974,401 A | 10/1999 | Enomoto |
| 5,982,994 A | 11/1999 | Mori |
| 5,984,174 A | 11/1999 | Kato |
| 6,005,482 A | 12/1999 | Moran |
| 6,017,157 A | 1/2000 | Garfinkle et al. |

(Continued)

FOREIGN PATENT DOCUMENTS

| | | |
|---|---|---|
| EP | 0 975 147 A2 | 10/1999 |
| WO | WO 01/82231 | 11/2001 |

*Primary Examiner* — Matt Kim
*Assistant Examiner* — Yongjia Pan
(74) *Attorney, Agent, or Firm* — Xin Wen

(57) ABSTRACT

A computer-implemented method includes providing a collage layout comprising one or more image receiving areas on a user interface, moving an image symbol representing a digital image into a first image receiving area in the collage layout; and storing a data structure comprising digital data associated with the digital image and digital data defining the one or more image receiving areas in the collage layout.

16 Claims, 21 Drawing Sheets

U.S. PATENT DOCUMENTS

| | | | |
|---|---|---|---|
| 6,025,923 A | 2/2000 | Kageyama | |
| 6,038,033 A | 3/2000 | Bender | |
| 6,064,397 A | 5/2000 | Herregods | |
| 6,085,195 A | 7/2000 | Hoyt | |
| 6,091,506 A | 7/2000 | Kayne | |
| 6,092,054 A | 7/2000 | Tackberry | |
| 6,097,389 A * | 8/2000 | Morris et al. | 715/804 |
| 6,123,362 A | 9/2000 | Squilla | |
| 6,133,985 A | 10/2000 | Garginkle | |
| 6,154,295 A | 11/2000 | Fredlund | |
| 6,169,998 B1 | 1/2001 | Iwasaki | |
| 6,269,341 B1 | 7/2001 | Redcay | |
| 6,273,979 B1 | 8/2001 | Lastoria | |
| 6,288,719 B1 | 9/2001 | Squilla | |
| 6,321,231 B1 | 11/2001 | Jebens | |
| 6,324,545 B1 | 11/2001 | Morag | |
| 6,327,050 B1 | 12/2001 | Motamed | |
| 6,332,146 B1 | 12/2001 | Jebens | |
| 6,349,194 B1 | 2/2002 | Nozaki | |
| 6,353,445 B1 | 3/2002 | Babula | |
| 6,362,900 B1 | 3/2002 | Squilla | |
| 6,369,908 B1 | 4/2002 | Frey | |
| 6,374,260 B1 | 4/2002 | Hoffert | |
| 6,384,934 B1 | 5/2002 | Kohtani | |
| 6,388,732 B1 | 5/2002 | William | |
| 6,453,300 B2 | 9/2002 | Simpson | |
| 6,477,580 B1 | 11/2002 | Bowman-Amuah | |
| 6,554,504 B2 | 4/2003 | Cook | |
| 6,560,376 B2 * | 5/2003 | Kimbell et al. | 382/296 |
| 6,570,640 B1 | 5/2003 | Garfinkle et al. | |
| 6,583,852 B2 | 6/2003 | Baum | |
| 6,667,814 B1 | 12/2003 | Tillotson | |
| 6,727,909 B1 | 4/2004 | Matsumura | |
| 6,738,494 B1 | 5/2004 | Savakis | |
| 6,955,003 B1 | 10/2005 | Lew | |
| 6,964,025 B2 * | 11/2005 | Angiulo et al. | 715/838 |
| 7,197,513 B2 | 3/2007 | Tessman | |
| 7,222,147 B1 | 5/2007 | Black | |
| 7,576,755 B2 * | 8/2009 | Sun et al. | 345/629 |
| 7,724,978 B2 * | 5/2010 | Nonaka et al. | 382/254 |
| 2001/0005834 A1 | 6/2001 | Simpson | |
| 2001/0010772 A1 | 8/2001 | Nakajima | |
| 2002/0001102 A1 | 1/2002 | Williams | |
| 2002/0122067 A1 * | 9/2002 | Geigel et al. | 345/788 |
| 2002/0138363 A1 | 9/2002 | Karas | |
| 2002/0154147 A1 | 10/2002 | Battles | |
| 2003/0214660 A1 | 11/2003 | Plass | |
| 2004/0023135 A1 | 2/2004 | Rochford | |
| 2004/0032599 A1 | 2/2004 | Atkins | |
| 2004/0133924 A1 | 7/2004 | Wilkins | |
| 2004/0151399 A1 * | 8/2004 | Skurdal et al. | 382/266 |
| 2004/0174563 A1 * | 9/2004 | Cassidy et al. | 358/1.18 |
| 2005/0273470 A1 * | 12/2005 | Heigold | 707/104.1 |
| 2006/0008175 A1 | 1/2006 | Tanakat | |
| 2006/0064639 A1 | 3/2006 | Reid | |
| 2007/0074110 A1 * | 3/2007 | Miksovsky et al. | 715/520 |
| 2007/0143714 A1 * | 6/2007 | Barbieri | 715/861 |
| 2007/0253028 A1 * | 11/2007 | Widdowson | 358/1.18 |

\* cited by examiner

FIG. 2A

Online Print Service - Shipping and Payment Info — 238

Shipping Information
Please select one of the following available shipping methods Standard Mail (5 to 7 Day Shipping Time) - $1.95
Standard Mail (5 to 7 Day Shipping Time) - $1.95
USPS Priority Mail (2 to 3 Day Shipping Time) - $3.50
FedEx (1 Day Shipping Time) - $14.95

— 240

Payment Information
Please select one of the following available payment methods AMERICAN EXPRESS card - online Secure payment — 242

IMPORTANT: For maximum security, your credit card information will be encrypted. Online credit card payment is the most convenient method of payment.

Card Number [ ] — 244

Expiration Date  04 / 2000 — 246

Name  Mr. John Philips — 248

[< Back]  [Next >]  [Cancel]  [Help]
         — 236

FIG. 2D

Online Print Service - Shipping and Payment Info — 250

Your order is ready to be processed. Please verify the information below. Press Finish if OK. Otherwise, you can go Back to correct your order.
All prices are in US Dollars

| # | Description | Unit Price | Qty | Price |
|---|---|---|---|---|
| 1 | 2 Packs of 4"x6" (same image) | $0.95 | 1 | $0.95 |
| 2 | 2 Packs of 4"x6" (same image) | $0.95 | 1 | $0.95 |
| 3 | 5"x7" Glossy Print | $0.99 | 2 | $1.98 |
| 4 | 5"x7" Glossy Print | $0.99 | 2 | $1.98 |

— 252

Subtotal $5.86
Shipping and Handling $1.95
Total $7.81

— 254

Payment Method  AMERICAN EXPRESS card online secure
A confirmation will be sent
to this email address  philips@mail.com

[< Back]  [Finish]  [Cancel]  [Help]

Image Collage Data Structure

— User ID: ABCD12345678

— Time of creation: 01032002; 10H25M20S

— Style: jumble tumble

— Application: editable

— Background: party theme or URL for picture

— Number of image objects: 4

— Number of text objects: 1

— Image object 1: URL, positions, image dimensions, orientation, borders, color enhancement — Image object 4: URL, positions, image dimensions, orientation, borders, color enhancement — Text object 1: text, positions, font style, font size, orientation, color

Fig. 13

IMAGE COLLAGE BUILDER

CROSS-REFERENCES TO RELATED INVENTIONS

The present application is a continuation application of and claims priority to U.S. patent application Ser. No. 11/403,625, filed on Apr. 13, 2006 now abandoned, titled "Image collage builder", the disclosure of which is incorporated herein by reference.

TECHNICAL FIELD

This application relates to the utilization of digital images.

BACKGROUND

A computer system 100 illustrated in FIG. 1 represents a typical hardware setup for executing software that allows a user to perform tasks such as communicating with other computer users, accessing various computer resources, and viewing, creating, or otherwise manipulating electronic content— that is, any combination of text, images, movies, music or other sounds, animations, 3D virtual worlds, and links to other objects. The system includes various input/output (I/O) devices (mouse 103, keyboard 105, display 107) and a general purpose computer 100 having a central processor unit (CPU) 121, an I/O unit 117 and a memory 109 that stores data and various programs such as an operating system 111, and one or more application programs 113. The computer system 100 also typically includes non-volatile memory 110 (e.g., flash RAM, a hard disk drive, and/or a floppy disk or other removable storage media) and a communications card or device 123 (e.g., a modem or network adapter) for exchanging data with a network 127 via a communications link 125 (e.g., a telephone line).

The computer 100 of FIG. 1 also can be connected to various peripheral I/O devices. One of the more popular of such peripheral devices is a digital camera 108 that enables users to take pictures and save them in digital (electronic) format. The digital camera 108 enables users to take pictures (i.e., images), which are saved in memory (not shown) within the digital camera 108 in a digital (electronic) format. After taking and storing the images, the user can connect the digital camera 108 to a computer system 100 in order to upload the digital images to the computer's disk drive or other non-volatile memory 110. Once the digital images are uploaded to the computer system 100, the user can erase the digital images from the memory of the digital camera 108 so that the user can take and store additional images using the digital camera 108. Typically, the digital camera 108 is connected to the computer 100 only while the user is uploading images to the computer's disk drive or other non-volatile memory 110.

Users also can obtain digital images, for example, of film-based prints from a traditional camera, by sending an exposed film into a photo-finishing service, which develops the film to make prints and then scans (or otherwise digitizes) the prints or negatives to generate digital image files. The digital image files then can be transmitted back to the user by e-mail or on a CD-ROM, diskette, or other removable storage medium.

In any event, once the digital images are stored on the computer 100, a user can perform various operations on them. For example, an image viewer application can be used to view the images or a photo editor application can be used to touch-up or otherwise modify the images. In addition, an electronic messaging (e.g., e-mail) application can be used to transmit the digital images to other users.

In addition to viewing the digital images on the computer display 107, users often desire to have hard copies (physical prints) made of digital images. Such hard copies can be generated locally by the user using output devices such an inkjet printer or a dye sublimation printer. In addition, users can transmit digital images (e.g., either over a computer network or by using a physical storage medium such as a floppy disk) to a photo-finishing service, which can make hard copies of the digital images and send them (e.g., by U.S. Mail or courier service) back to the user.

FIGS. 2A-2F show a sequence of screen shots that a user might encounter when transmitting digital images to a photo-finishing service to have hard copies (prints) made of the images. In FIG. 2A, the user first encounters a contact information window 200 in which the user must enter several items of contact information such as first and last names 202, 204, address 206, city 208, state 210, country 210, phone 214, fax 216, and Email address 218. This information typically is required by the photo-finishing service for each order for purposes of billing and shipping.

After the user has entered the required information, the user presses the Next button 220 to arrive at the next screen— an image selection window 222 as shown in FIGS. 2B and 2C. In the image selection window 222, the user designates the specific images of which hard copies are to be made. The digital images either can be selected from among the images stored on the user's computer by clicking the "Select Image . . . " button 230 or they can be acquired from a digital camera or scanner attached to the user's computer by clicking the "Acquire Image . . . " button 232. Once selected, the images can be viewed and/or cropped by clicking on the "View/Crop" button 234. In addition, the user can designate the hard copy format and other parameters (e.g., size, number of copies, paper type) for each of the selected images by selecting or entering the desired options using drop-down list 224 and text box 226. The selected images and their associated parameters are shown in display area 228. Typically, each order for prints must meet a minimum order amount 223 (e.g., five dollars).

After the images and their respective hard copy parameters have been selected, the user clicks the Next button 236 and a shipping and payment information window 238 is presented. In this window 238, the user selects a desired shipping method from drop-down list 240 and specifies a method of payment and associated verification information in text boxes 242, 244, 246 and 248.

After this information has been provided, the user clicks the Next button 250 and is presented with an order confirmation window as shown in FIG. 2E. The order verification window 250 allows the user to view and confirm the order including the images selected and their respective parameters in display area 252, as well as the price of the order 254. If the user is satisfied with the order, the user clicks the Finish button 256 to complete the order.

Upon completing the order, the images are uploaded to the photo-finishing service as indicated by the upload window 258 in FIG. 2F. Once the images are uploaded, the photo-finishing service arranges to have prints made of the selected images and to have the prints mailed to the user and address specified in the contact information window 200 shown in FIG. 2A. If the user desires to have prints of the same (or different) images sent to another person (e.g., a family member or friend), the user typically must repeat the entire order generating process represented by FIGS. 2A-2F. Generally, repeating the ordering process to send prints to another person involves entering a considerable amount of redundant information and incurring separate charges, including multiple minimum order charges, on the user's credit card (or other financial instrument) as well as potentially requiring the image to be uploaded multiple times.

Collages are traditionally made by sticking photographic prints to a surface. Artistic composition made of various materials (such as paper, cloth, or wood) can also be glued on to the surface. Digital imaging software can also assist the grouping of digital images to form an image collage. A group of digital images are first selected. The software then distributes the selected images in a pre-designed pattern to form an image collage. The image collage can be as a stand-alone digital image. There is thus a need to provide easy and flexible methods for creating and using image collages.

SUMMARY

In one general aspect, the present invention relates to a computer-implemented method, comprising:

providing a collage layout comprising one or more image receiving areas on a user interface;

moving an image symbol into a first image receiving area in the collage layout, wherein the image symbol represents a digital image; and storing a data structure comprising digital data associated with the digital image and digital data defining the one or more image receiving areas in the collage layout.

In another general aspect, the present invention relates to a data structure for an editable image collage, comprising:

dimensions of a collage layout;

a first data object to store the boundaries of a first image receiving area in the collage layout; and a second data object configured to identify a first digital image associated with the first image receiving area, wherein at least one of the first data object and the second data object can be edited by a user.

In another general aspect, the present invention relates to a computer system for processing one or more images, comprising:

a display configured to display a collage layout comprising one or more image receiving areas on a user interface;

a user interface device configured to enable the movement of an image symbol into a first image receiving area in the collage layout, wherein the image symbol represents a digital image; and a computer storage device configured to store a data structure comprising digital data associated with the digital image and digital data defining the one or more image receiving areas in the collage layout.

Advantages may include one or more of the following. The disclosed systems and techniques provide intuitive visual abstractions and mechanisms for efficiently and quickly creating image collages. Images for a collage can be easily selected from a user's digital image albums, and moved into a collage template by dragging the image and dropping it in an image receiving area in the collage template. Image collages including image and text objects can be saved as a data object that can subsequently be retrieved. The saved image collage can be edited to allow the image or text objects to be changed in the image collage. The saved image collage can be incorporated in an image-based product or electronically displayed or shared.

The details of one or more embodiments are set forth in the accompanying drawings and the description below. Other features, objects, and advantages of the invention will become apparent from the description and drawings, and from the claims.

DRAWING DESCRIPTIONS

FIGS. 2A-2F show a sequence of screen shots that a user might encounter when transmitting digital images to a photofinishing service provider.

FIG. 13 is an exemplary data structure for an image collage stored on a computer device.

DESCRIPTION

Figure 3:
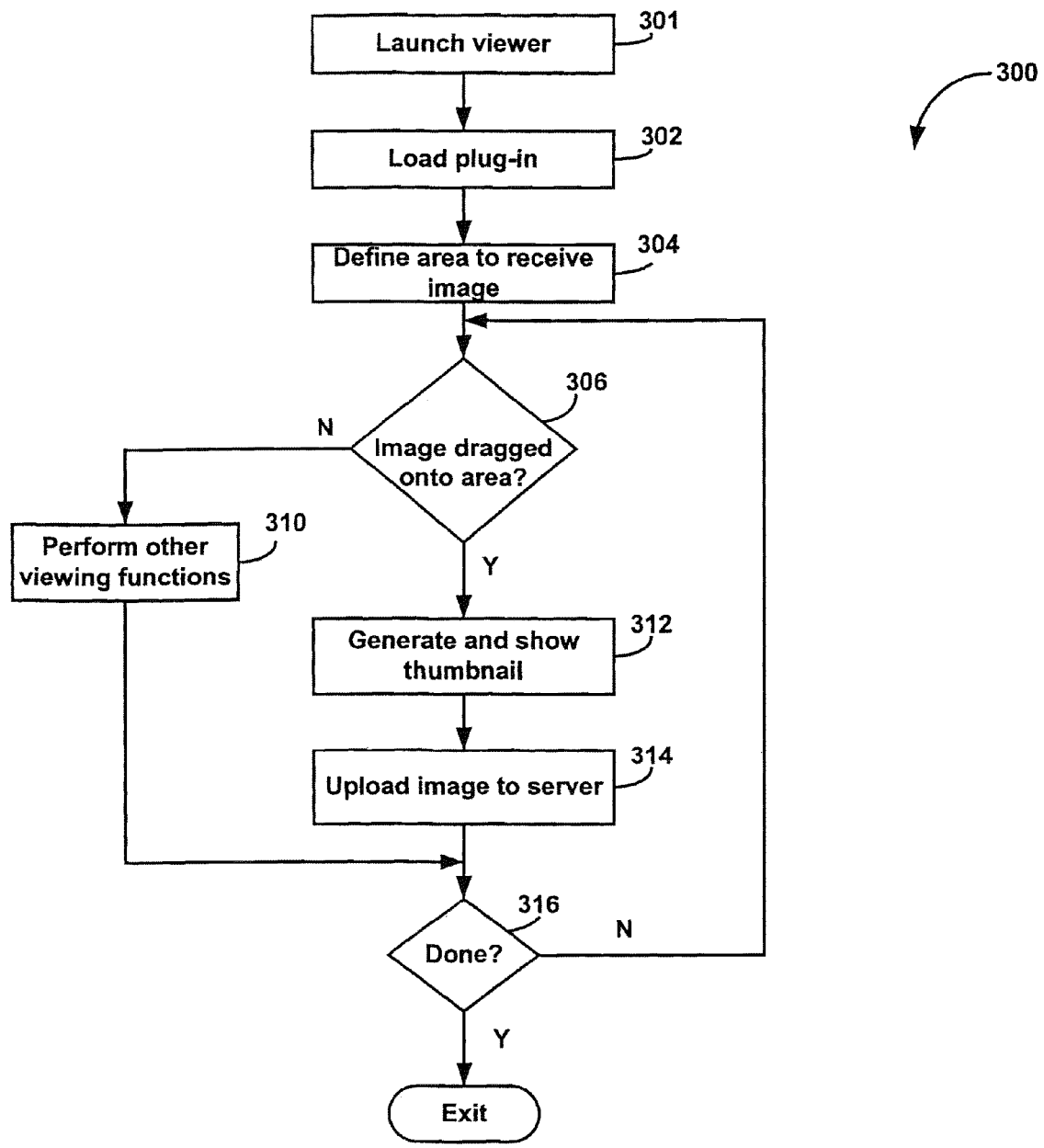
FIG. 3 show a process for generating a thumbnail associated with an image file and for uploading the image file.

Referring to FIG. 3, a process 300 for operating on an image file is shown. First, a viewer is launched (step 301). The viewer can for example be a web browser application that can be loaded with a set of embedded tags such as HTML tags that instruct the browser to instantiate or load a software module such as a plug-in. The plug-in is a software program that extends the capability of the browser to provide the ability to receive images dragged over an area defined by the plug-in. The browser does not need to run an external application in order to interpret the data, and the result can be embedded as part of the Web page. This presents the user with a single unified user interface where the Web document is a container for many different media types.

An example fragment of HTML which instantiates the Windows Internet Explorer version of the upload plugin in a web page is shown below:

```
<object id="uploaderControl" widthF0 height 0
codebase="Uploader.cab#Version=1,0,0,1"
classid="CLSID:B534D8C5-72CE-11D3-80A2-0050DA1AB5D6">
<param name="Server" value="http://upload.shutterfly.com">
<param name="AuthenticationID" value="000199670125">
<param name="UploadChunkSize" value="32768">
<param name="Mode" value="Select">
</object>
```

The software module is then loaded (step 302) to customize the viewer. The software module defines an area on the screen and registers this area with the viewer as a drag-and-drop target to receive images whenever an image is dragged into the area (step 304).

Next, the process 300 checks whether the user has dragged and dropped an image over the area defined in step 304 (step 306). This is done by periodically checking events presented by the operating system to the software module. If the events are associated with the software module, the software module executes operations associated with the events and proceeds to step 312. These operations include selecting certain images for transmission to other parties, or grouping certain images into albums, for example.

If the user has not dragged and dropped an image over the area, the process 300 allows a user to perform other viewing operations (step 310). Examples of the other viewing operations include creating and editing image files before ordering or shipping physical manifestations of one or more images. The physical manifestation of the digital content may include photographic prints of the one or more digital images, framed photographic prints, photo-album pages bearing one or more digital images, compositions of digital images and other graphical and/or textual content, and/or artifacts bearing a digital image such as a novelty item, a shirt, a coffee mug, a key-chain, a mouse pad, a magnet, or a deck of playing cards. Optionally, the set of digital content may include graphical and/or textual content, and the physical manifestation of the set of digital content may include a card (e.g., a greeting card, a holiday card, an announcement, a playing card, a post card, a thank you card, or an invitation), an advertisement, a coupon, and/or a bound volume (e.g., a photo-album or a travel book) bearing the graphical and/or textual content. The graphical and/or textual content can include digital images, digitized content, and/or computer-generated content. Other operations include ordering prints associated with all images, or alternatively dividing an order into a plurality of sub-orders so that each sub-order corresponds to a different specified recipient and includes an instance of each digital image associated with the recipient corresponding to the sub-order. The order may be specified by receiving interactive input from the viewer.

Alternatively, if the user has dragged an image onto the defined area, the process 300 generates and shows a thumbnail associated with the image (step 312) on the browser. The thumbnail is generated by the user computer. The thumbnail is shown as an additional part of the page previously loaded from the server. The combination of the newly generated thumbnail and the page is then shown by the browser.

Next, the process 300 uploads the image onto a server (step 314). The process 300 checks whether the user has completed operation using the viewer (step 316). If not, the process 300 loops back to step 306 to continue handling user requests. Alternatively, the process 300 exits.

In one embodiment, a browser plug-in is loaded to provide an active area on the browser where the customer can drag-and-drop images onto the active area. The plug-in is a collection of computer instructions that is detected by a computer process on the user's computer at run-time and subsequently invoked during run-time. The browser provides a mechanism through which separately provided plug-ins are detected and by which a user can invoke execution of any of the plug-ins. When the user drags and drops a picture into the active area, the thumbnail of the picture appears on the browser. Alternatively, the customer can select images using a standard file selection dialog.

In one implementation, the plug-in is implemented as dynamically linked libraries (DLLs). A DLL is a library or a collection of computer instruction modules that can be invoked (linked) by computer instruction modules in another computer program. The invocation is performed dynamically, i.e., at run-time. The computer instruction modules of a DLL are loaded into the address space of a computer process and references to the computer instruction modules are resolved into the addresses of the loaded computer instruction modules.

Although the process of FIG. 3 is directed at uploading image files, any other file transmission operations can be performed. For instance, the user optionally can attach the image file, to an e-mail message before it is sent. In this embodiment, the user can simply drag the image icon 205 from the desktop and drop it into a message text region and the image file can then be sent. Upon receipt, recipient(s) can view and otherwise access the digital image.

Figure 4:
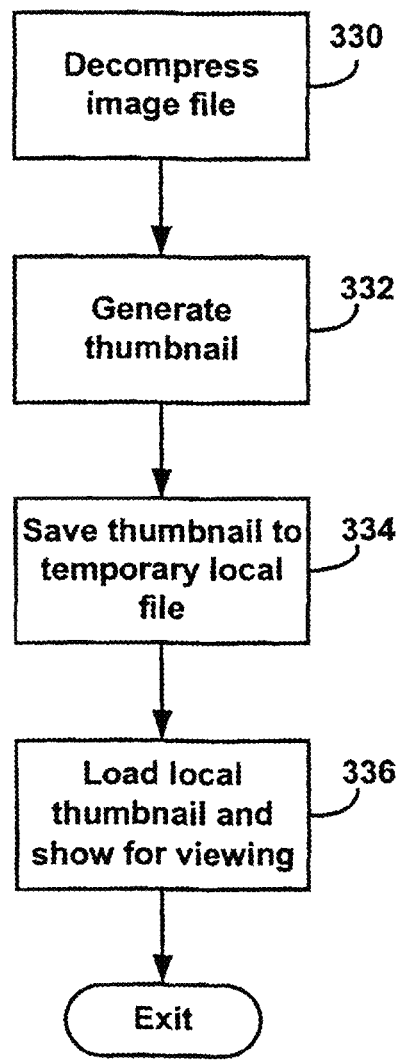
FIG. 4 shows in more detail operations associated with generating and saving the thumbnail.

Turning now to FIG. 4, step 312 is illustrated in more detail. First, the process of FIG. 4 decompresses the image file (step 330). In one embodiment, the image file can be decompressed in accordance with a standardized image compression mechanism such as JPEG (Joint Photographic Experts Group). JPEG exploits known limitations of the human eye, notably the fact that small color changes are perceived less accurately than small changes in brightness. Although the degree of lossiness can be varied by adjusting compression parameters, to preserve image quality, the image should be compressed with an appropriate quality setting (e.g., Q 75 or more). More information about the Independent JPEG Group and its library for JPEG compression and decompression is available at www.ijg.org.

During decompression, step 330 allocates and initializes a JPEG decompression object. This step then reads compressed data from the image file as well as the header of the image file to obtain image information. Parameters for decompression are then set based on the properties of the image (in particular, its colorspace). An option allows the returned image to be scaled and allow various speed/quality tradeoffs to be selected. Once the parameter values are satisfactory, the decompression process is started, which will initialize internal state, allocate working memory, and prepare for returning data. After completing a decompression cycle, the JPEG object is destroyed. Accessing the decompressed data is done by reading pixels in all scan lines.

The process of FIG. 4 then generates a thumbnail associated with the image (step 332). The thumbnail is generated by down-sampling the decompressed image file. The thumbnail is saved to a temporary local file on the user's computer (step 334). Next, the local thumbnail is shown and is made available for the user to deploy as appropriate (step 336). Particularly, the thumbnail is presented to the viewer with a path to a file associated with the thumbnail. The thumbnail is presented to the user as if the thumbnail is a part of the page served by the remote server. Thus, the user can use the thumbnail with an impression of instant access, even though the image file is not yet available from (or uploaded to) the server.

Figure 5:
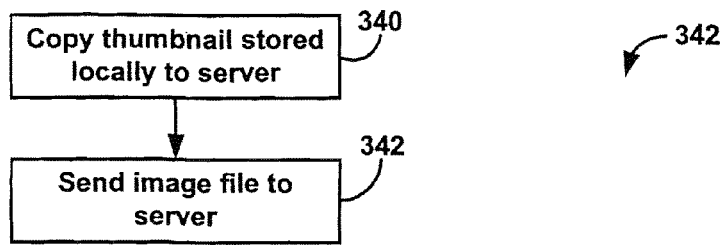
FIG. 5 is a flowchart of a process for uploading image files to a server.

Referring now to FIG. 5, step 314 of FIG. 3 is shown in more detail. First, the thumbnail is generated and stored on the user's local computer (step 340). Generation of the thumbnail includes decompressing the original file, filtering and down-sampling the image to the desired thumbnail resolution, and recompressing the thumbnail image as a JPEG file. Optionally, the process of FIG. 5 applies additional image filtering operations such as sharpening, resizing, rotating, sharpening, or color reducing operations to enhance the appearance of the thumbnail. Although JPEG is used in one embodiment, the technique is not specific to JPEG images, but rather any other method of compressing or decompressing images can be used.

When the user indicates that an image is to be uploaded (for example, by dragging and dropping the image onto a browser plug-in area), a thumbnail is first created and transmitted to the server before the entire image is uploaded. This allows the thumbnail to be displayed and used by the user while the full file is being uploaded. Thus, the user does not have to wait for the upload to finish before the user can view or access the thumbnail on the web site. The uploading of the thumbnail also allows other users to have access to the thumbnail before the full image is uploaded. This technique is also efficient in that it avoids the need to upload the full image file to the server and generating the thumbnail at the server.

When the image file is sent to the server (step 342), a script on the server (web page) loads a copy of the thumbnail from client's computer. The original thumbnail stays on the client computer. The script executes an operation that loads the thumbnail stored on the customer's computer as an image on the page displayed by the browser. Images can be manipulated almost instantaneously. In addition, the process of FIG. 5 can perform a lossless compression of the file before uploading the file.

Figure 6:
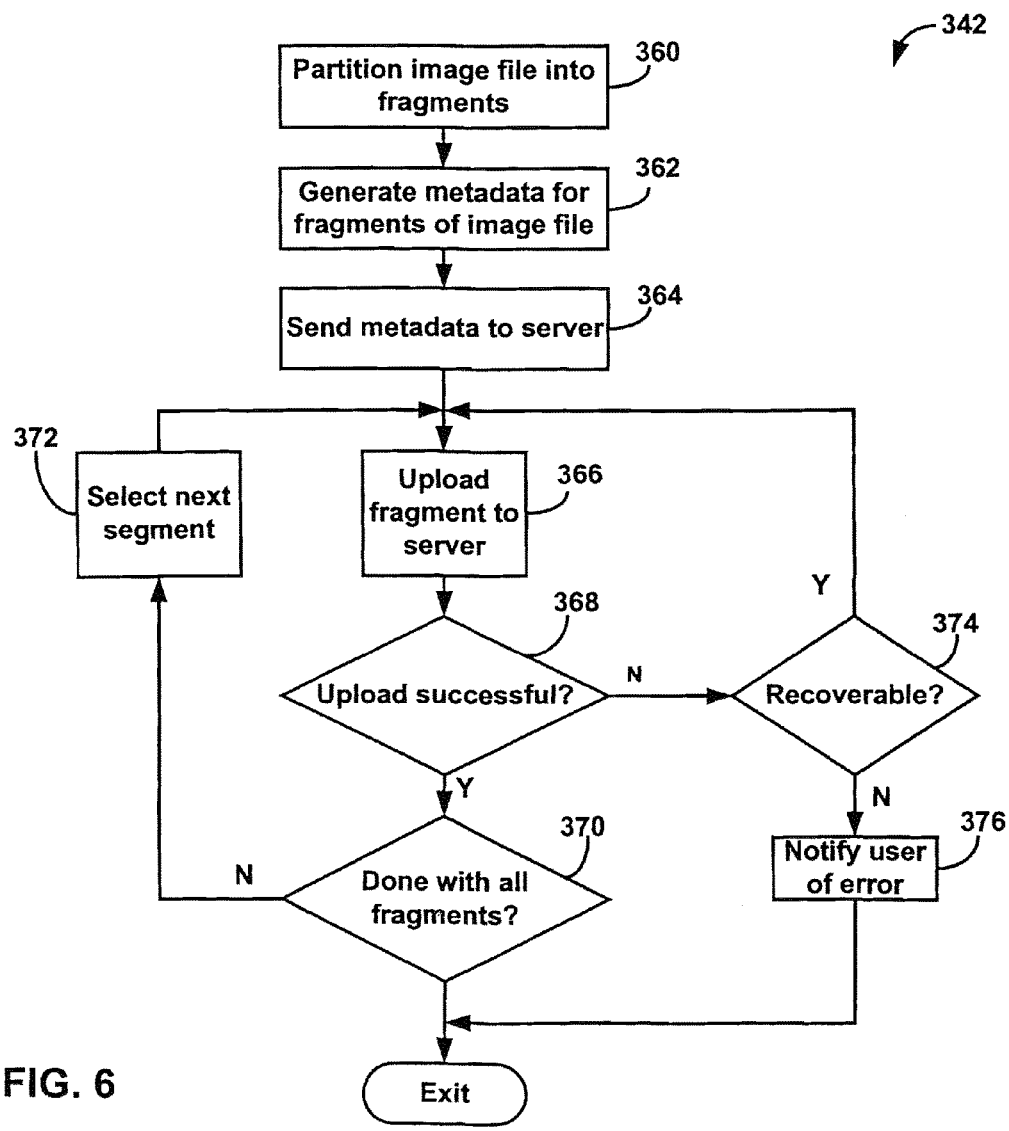
FIG. 6 is a flowchart showing in more detail the uploading of image files.

Referring now to FIG. 6, step 342 is shown in more detail. First, the image file is partitioned into one or more fragments (step 360). Next, the process of FIG. 6 generates metadata associated with the fragments of the image file (step 362). The metadata transmitted to the upload server relates not only to the individual fragments, but to the image and the image upload as a whole. In one embodiment, the data provides information on:
- raw image dimensions and file size
- preferred viewing orientation
- location of the original local file
- location of a cached copy of the original file
- size of fragments to be transmitted
- total number of fragments to be transmitted The metadata is then sent to the server (step 364). From step 364, the current fragment is uploaded to the server (step 366). Next, the process of FIG. 6 checks whether the upload was successful (step 368). If so, the process of FIG. 6 checks whether all fragments have been uploaded (step 370). If not, the next segment is selected (step 372) and the process of FIG. 6 loops back to step 366 to continue uploading the image file.

From step 368, in the event that the upload was not successful, the process of FIG. 6 checks whether the error is recoverable (step 374). If so, the process may optionally notify the user or alternatively may simply loop back to step 366 to retry the uploading of the fragment. The error is recoverable if a communication link such as an Internet link is present so that the fragment can be resend. If there is failure, the process can restart the upload after the last fragment had been successfully uploaded before occurrence of the error without re-uploading the entire image file. Thus, recovery time is minimized.

From step 374, if the error is not recoverable, the process of FIG. 6 notifies the user with an error message (step 376). The message can be sent using a variety of modalities, including email, telephone call, facsimile transmission, among others. In addition, the message can inform user on how to restart the upload. The message can also use available information about the image being uploaded to the server to provide diagnostic information in email message, including the file name, the number of fragments received and the number of outstanding fragments, the location of the file, and instructions on finishing the upload, among others. The instructions can simply instruct the user to establish the communication link and execute the browser so that the browser is activated and can continue the uploading process. From step 370 to step 376, the process exits.

The process in FIG. 6 can gracefully handle upload failures by providing automatic recovery and/or informing users that an upload had failed so that the user can restart the upload process. The process of FIG. 6 can handle both system related errors as well as user related errors. For instance, the user may start the upload and forget that the upload process is running due to the time required to upload multi-megabyte image files and later either turn off the computer or quit the viewer. The feedback provided by the process of FIG. 6 informs the user that he or she needs to take corrective actions rather than assume that the upload process was successful.

Figure 7:
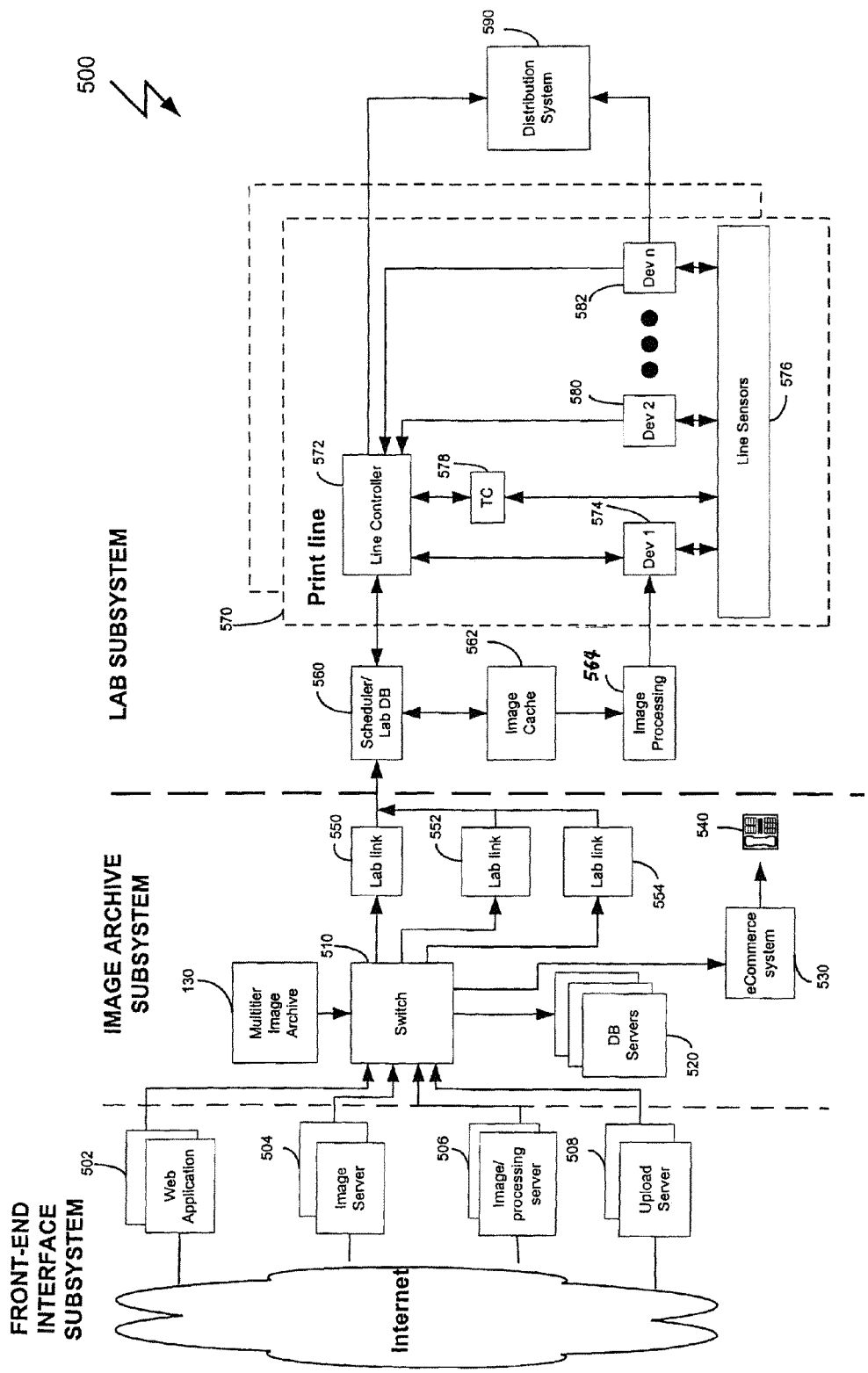
FIG. 7 is a block diagram of an embodiment of a print laboratory system.

Once the image has been uploaded, it may be shared with others, or may be printed as a photograph. FIG. 7 illustrates an embodiment that uses image data uploaded by the system of FIG. 3 in an application for handling photographic print images. The system in FIG. 7 has a front-end interface subsystem that is connected to a wide area network such as the Internet. The front end interface subsystem includes one or more web application systems 502, one or more image servers 504, one or more image processing servers 506, and one or more upload servers 508, all of which connect to a switch 510.

The switch 510 in turn routes packets received from the one or more web application systems 502, image servers 504, image processing servers 506 and upload servers 508 to the multi-tier image archive system 130.

The switch 510 also forwards communications between the web application systems 502, image servers 504, image processing servers 506 and upload servers 508 to one or more database servers 520. The switch 510 also is in communication with an e-commerce system 530 that can be connected via a telephone 540 to one or more credit card processing service providers such as VISA and MasterCard.

The switch 510 also communicates with one or more lab link systems 550, 552, and 554. These lab link systems in turn communicate with a scheduler database system 560. The scheduler database system 560 maintains one or more print images on its image cache 562. Data coming out of the image cache 562 is provided to an image processing module 564. The output of the image processing module 564 is provided to one or more film development lines 574, 580 and 582.

The scheduler database 560 also communicates with a line controller 572. The line controller 572 communicates with a quality control system 578 that checks prints being provided from the photographic film developing lines 574, 580 and 584. The quality of prints output by the film developing lines 534, 580 and 582 can be sensed by one or two more line sensors 576, which reports back to the quality controller 578. The output of the print line 570 is provided to a distribution system 590 for delivery to the users who requested that copies of the prints.

The multi-tier system uses a name resolution protocol to locate the file within the multi-tier structure. In this protocol, given an image ID, an image can be located on the multi-tier system without incurring the cost of accessing a name database. This is achieved because each image ID is unique and database lookups are not needed to resolve the desired image. This level of scalability is important since it provides the ability to scale the image retrieval bandwidth by just increasing the number of image server independent of the number of database servers. In order words, the name resolution protocol decouples the database bottleneck from the image retrieval bottleneck.

After the prints, recipients and respective parameters have been specified, the user's order is fulfilled by making prints of the designated images and distributing them to the specified recipients (step 406). In general, fulfillment can be accomplished either by the photo-finisher itself or by another entity or company in cooperation with the photo-finisher. Potentially, the photo-finisher could have business arrangements with two or more different fulfillment companies, which could be dispersed geographically (at various locations around the country or world) to minimize shipping costs, labor costs and/or delivery time. Alternatively, or in addition, different fulfillment companies could be used which have different areas of expertise or production capability. For example, one fulfillment company could specialize in making standard photographic prints, another fulfillment company could specialize in printing greeting cards, yet another fulfillment company could specialize in generating T-shirts, and so on.

Distribution and delivery of the prints to recipients could be accomplished by any of various techniques. For example, standard U.S. Mail or courier services (e.g., Federal Express or UPS) could be employed. Alternatively, the photo-finisher could have a business arrangement with various other service or delivery companies to deliver print orders along with other regularly scheduled deliveries. For example, the photo-finisher could have a business arrangement with a delivery or service company in which the prints for a particular recipient would be generated on the delivery/service company's premises and then delivered either alone or along with that recipient's order of other goods/services.

Figure 8:
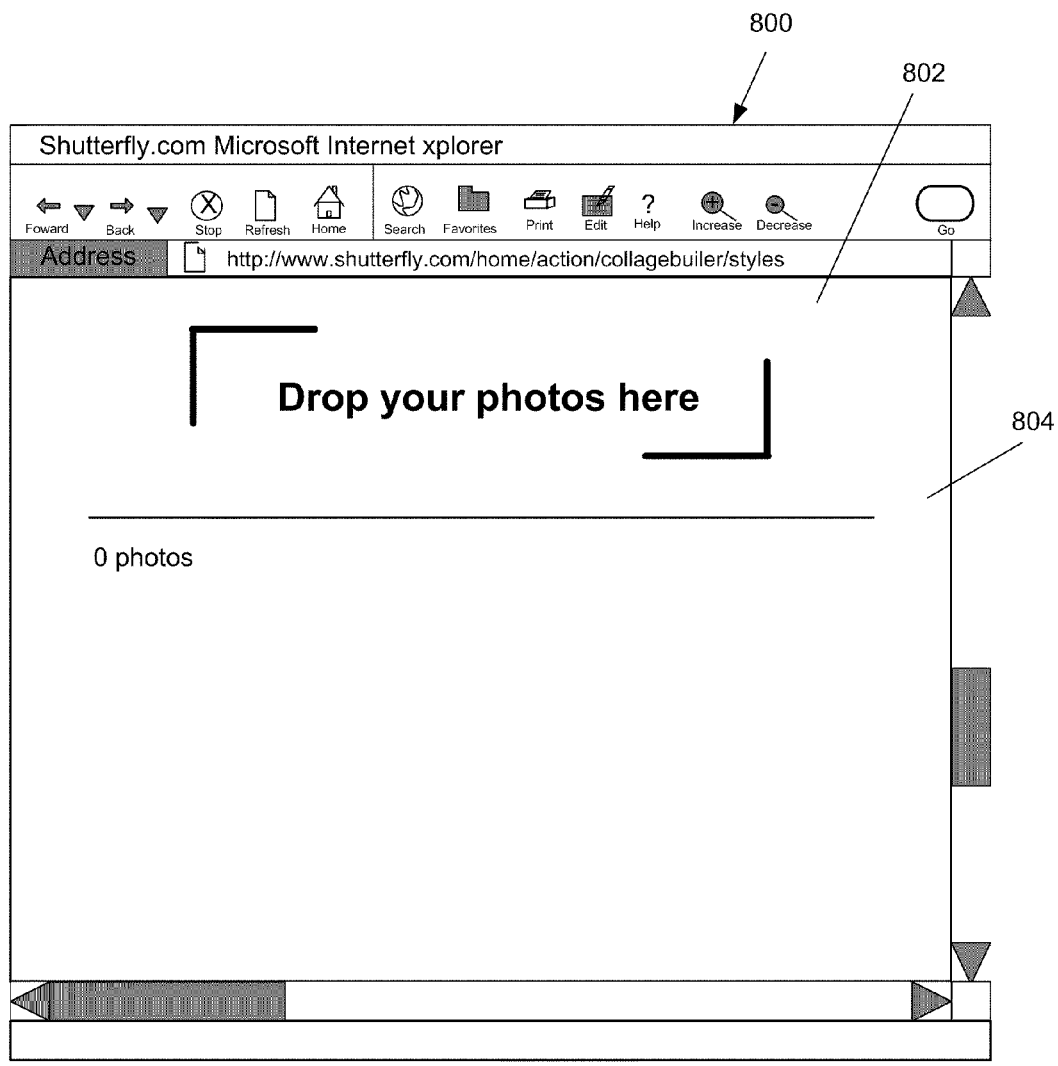
FIGS. 8-9 show two screen shots of an exemplary upload page in a web site.
Figure 9:
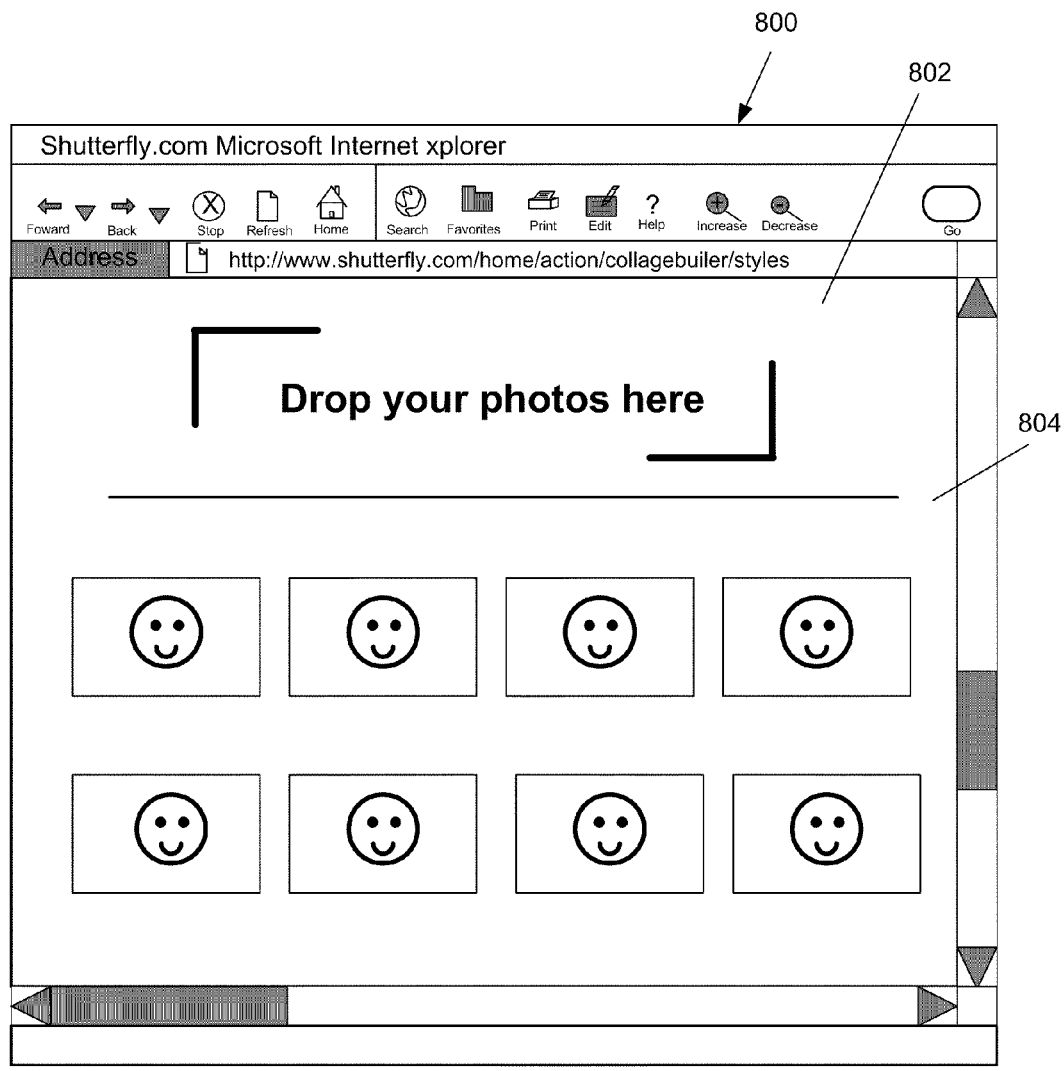

FIGS. 8 and 9 are screen shots of an exemplary upload page in a web site before and after dropping images onto the plug-in area. As shown in FIG. 8, a user can view a photo-finisher's web page 802, hosted on a remote server, in a browser window 800 on a client computer. The area 804 demarcated by the photo corners, which displays "Drop you photos here" is the active region for receiving an image file.

As shown in FIG. 9, after the user has dragged and dropped selected images into the image area 804, the plug-in causes thumbnails 805-812 to be generated locally and displayed in the image area 804 as part of the web page 802. Subsequently, the thumbnails and their corresponding images can be uploaded to the server as described above.

The disclosed systems and techniques provide intuitive visual abstractions and mechanisms for efficiently and quickly creating image collages. In the present specification, the term "image collage" refers to a single page that comprises a group of images and other objects such as text and graphic designs. The single page can be defined by digital data. The relationship between the image objects, the text and other objects can be defined in a data structure that can be stored on a computer device. The term "collage template" refers to a template that defines the initial configuration of the image, the text or other objects on a yet-to-be-formed image collage.

Figure 10:
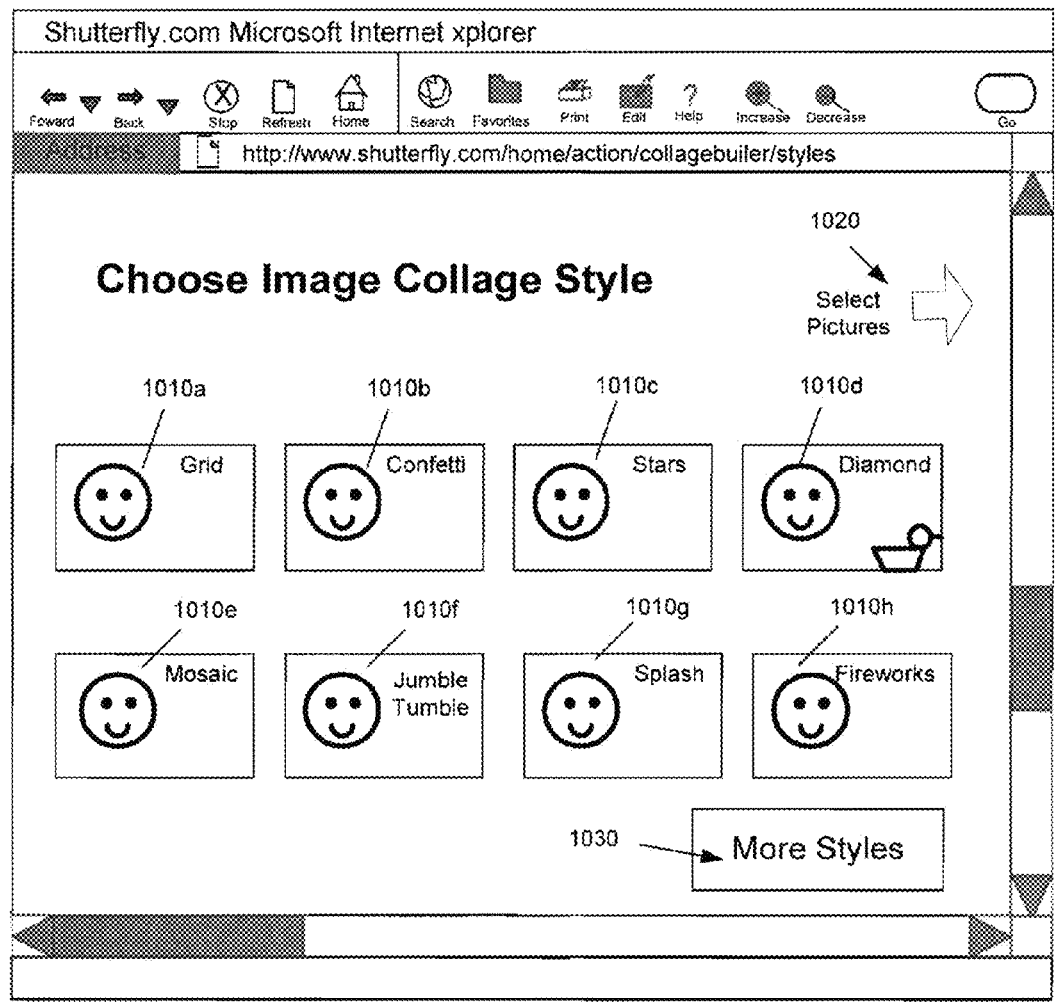
FIG. 10 is an exemplary user interface for selecting the style of a collage template.
Figure 17:
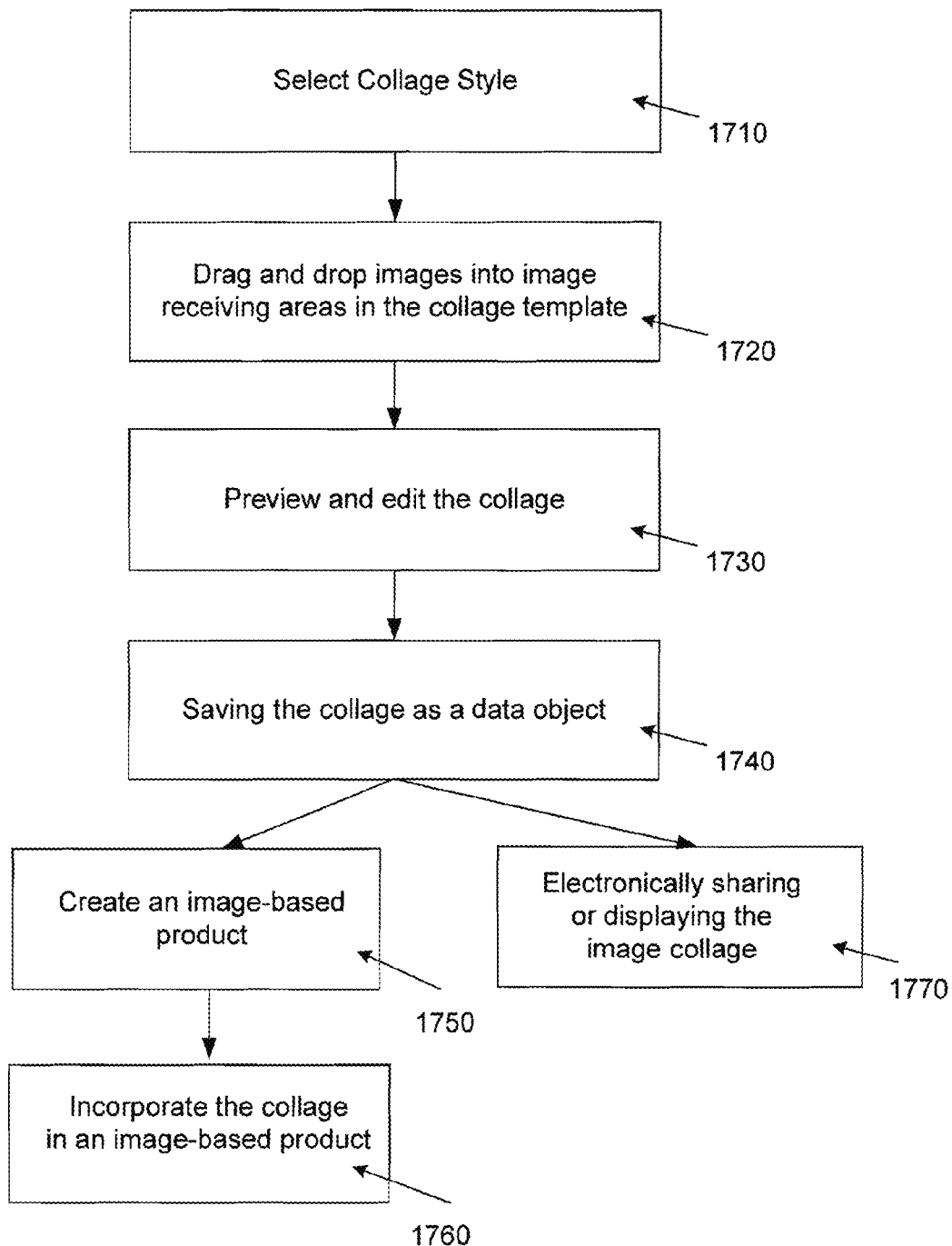
FIG. 17 shows an exemplary process for creating and using an image collage.

FIG. 10 is an exemplary user interface for selecting the style of a collage template. FIG. 17 shows an exemplary process for creating and using an image collage. The user interface shown in FIG. 10 can be implemented on a local computer device, or powered by a remote server using a web browsing software. A plurality of collage template styles can be displayed on the user interface. The collage styles can include for example "Grid" (1010*a*), "Confetti" (1010*b*), "Stars" (1010*c*), "Diamond" (1010*d*), "Mosaic" (1010*e*), "Jumble Tumble" (10100), "Splash" (1010*g*), and 'Fireworks" (1010*h*), each of which can be shown by text and an image symbol representing the collage style. The user can select a collage style by clicking one of the collage symbols (step 1710). The selected image symbol will be high lightened. The user can click a button "More Styles" 1030 where the user can find more style selections. After the collage style selection, the user can click on an arrow labeled by "Select Pictures" (1020) to select images for the selected image collage.

Figure 11:
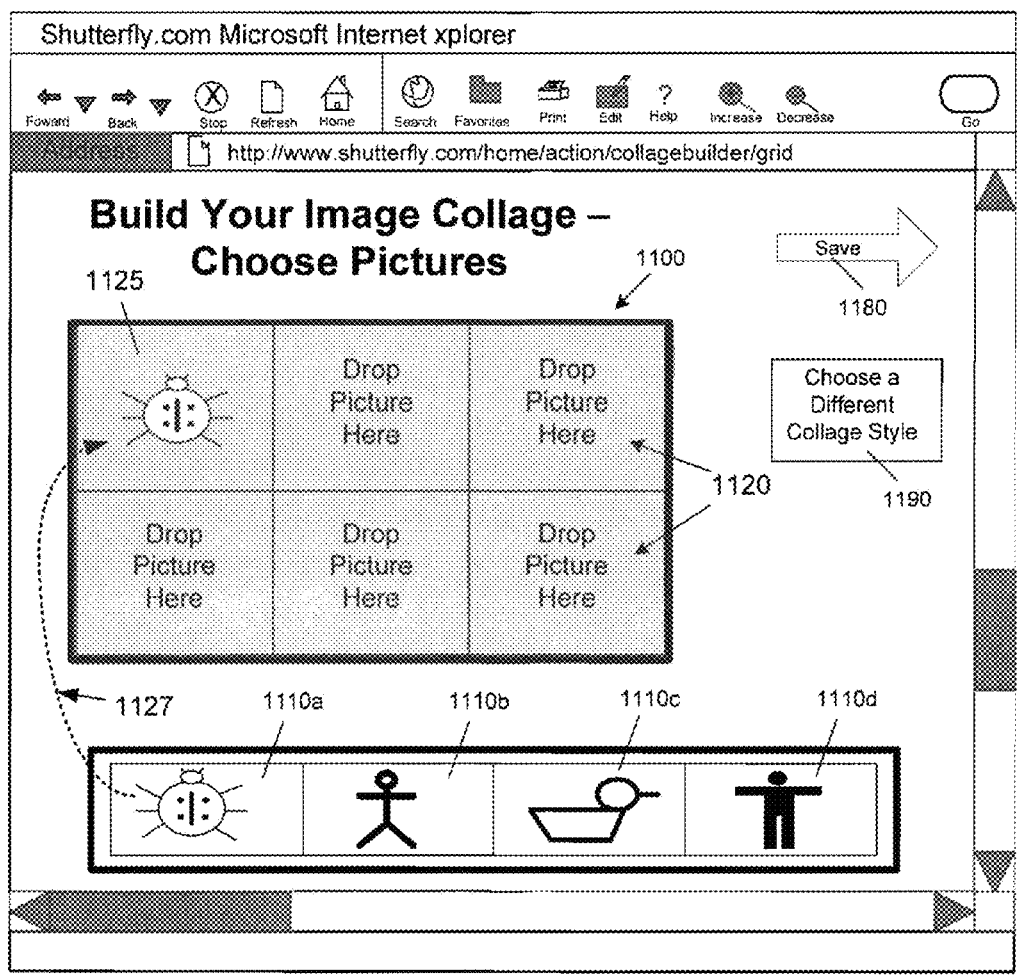
FIG. 11 is an exemplary user interface that a user can use to select a user's image and place it in an image receiving area in a collage template.

FIG. 11 illustrates an exemplary user interface that includes a user-selected collage template 1100 in a simple "Grid" style and a plurality of image symbols 1110*a*-110*d*. The collage template 1100 can include a plurality of image receiving areas 1120. Each of the image receiving areas 1120 can be labeled by "Drop Picture Here" to instruct the user where the images are to be placed. The image symbols 1110*a*-1110*d* each represents a digital image that can be stored locally on a computer wherein the user interface is provided. The digital images represented by the image symbols 1110*a*-1110*d* can also be provided uploaded by the user to a remote network location. The image symbols 1110*a*-1110*d* can be arranged in a film tripe metaphor as shown, or in photo albums and photo galleries. The image symbols 1110*a*-1110*d* can be displayed as thumbnail images as shown in FIG. 11, but can also be shown a thumbnail image of the digital image, a file name of the digital image, and an image icon representing the digital image.

The user can conveniently use a computer mouse to select an image symbol 1110*a*, drag it across the user interface, and dropped the image into the image receiving area 1125 (step 1720). The path for the image drag and drop is indicted by the arrow 1127 in FIG. 11. The user can also change the style of the collage by clicking a button 1190, wherein the selected images can automatically populate a new image template. The user can also drag and drop the images already being placed in one image receiving area 1120 to a different receiving area 1120 (step 1730). After the selection of the images is complete, the user can click on button 1180 to save the image collage (step 1740).

Figure 12:
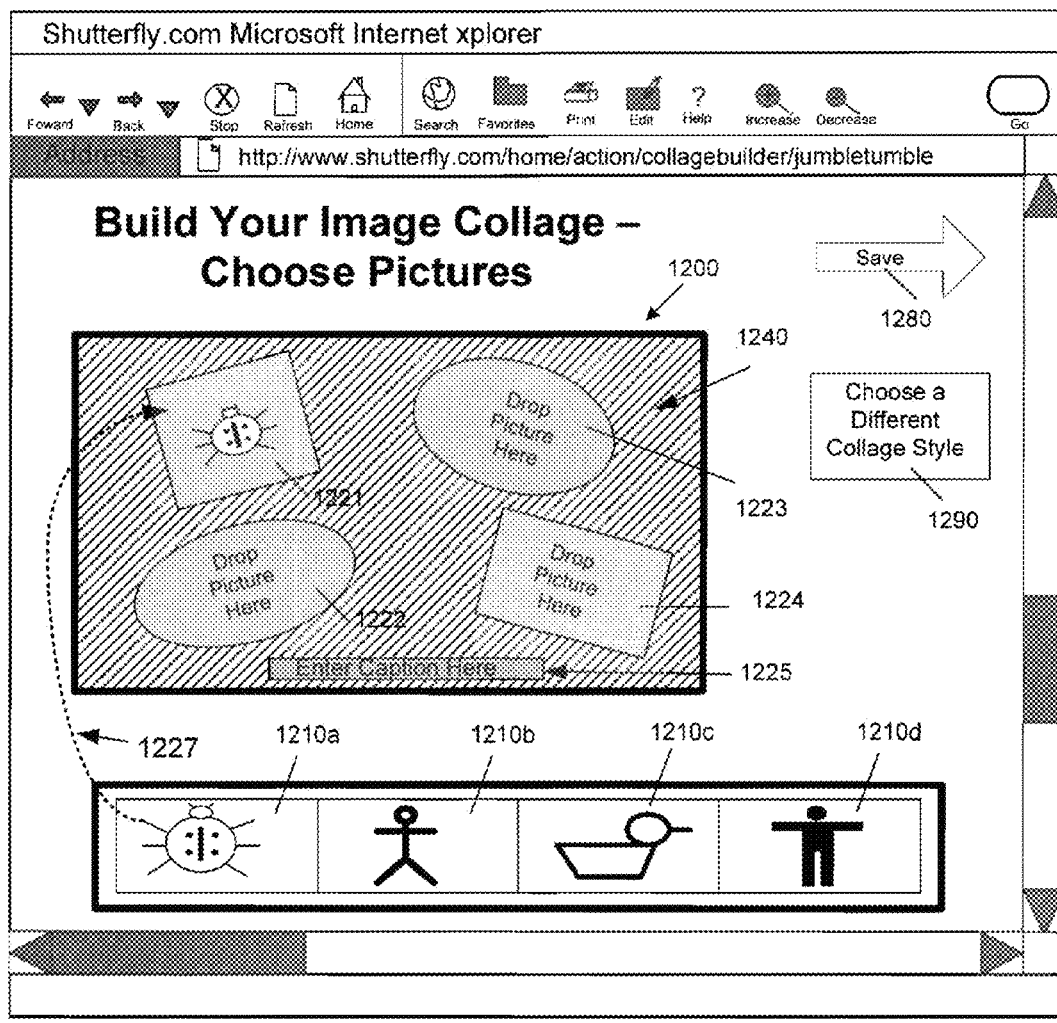
FIG. 12 is an exemplary user interface that a user can use to select a user's image and place it in an image receiving area in another collage template.

FIG. 12 illustrates another exemplary user interface for a user to select digital images represented by image symbols 1210*a*-1210*d* for a collage template 1200 in a simple "Jumble Tumble" collage style. The collage template 1200 includes a plurality of image receiving areas 1221-1224 for receiving images to form image object in the image collage to be created. The template 1200 can also include one or more text receiving areas 1225 for the user to enter text to form text object in the image collage to be created. The user can user a computer I/O device such as a mouse to drag the image symbol 1210*a* along a path 1227 to drop the image in the image receiving area 1221 (step 1720). The image receiving areas can have various different shapes ad orientation. The image receiving areas can also overlap with each other. For example, the image receiving area can include the background 1240 that can be selected from a plurality of stock images providing various background themes or from one of the user's own images. The user can also change the collage template by clicking a button 1290.

After the images and the text are selected or entered, the user can user a computer I/O device to adjust the positions, the orientations, or the sizes of the image or text objects 1221-1225 (step 1730). The user can also add a border to the image, or enhance the colors of the image by change contrast, color saturation, or tones (e.g. from color to sepia or black-and-white). The user can also change the font type, the font size, the color, or format of the text in the text object 1225. The image collage can be saved by clicking a button 1280. The user can also move the images and text already located on collage template 1200 to a different image or text receiving areas on the collage template 1200.

The image collage can be saved as a computer data structure for future retrieval and usage (step 1740). The computer data structure can include all the properties associated with the image collage. In the present specification, the term data structure refers to a collection of inter-related data objects. A data object is an entity for holding data for specific property. In the example of a data structure for image collage, the data structure includes a plurality of data objects that can define different aspects of the image collage, as discussed below.

FIG. 13 is an exemplary data structure 1300 for an image collage stored on a computer device. The data structure 1300 for the image collage can be edited by a user to allow the image collage to be changed subsequent to its saving before it is applied to an image-based product and electronic display or sharing. The data structure 1300 can include dimensions of the image collage, normally in the number of image pixels along each dimension. The data structure 1300 can also include the user ID of the user who created the image collage, the times when the image collage was edited and/or saved, the collage style used, the properties of the background, and the properties of the image and text objects. The images can be referenced by the location of the computer storage device where they are stored (e.g. an html link or an URL). The data structure 1300 can further include image data for a low-resolution copy of the digital image associated with an image receiving area in the image layout.

The data structure 1300 allows the rending of an image collage to produce an intact digital image, for example, in bitmap or JPEG format. The image and text objects are fixed in the intact digital image. But the dimensions of the digital image can be scaled to fit into the image receiving area of the image-based product or for electronic sharing. Furthermore, the data structure 1300 can include information to identify the location where the intact digital image is stored or the image data for the intact digital image.

Figure 14:
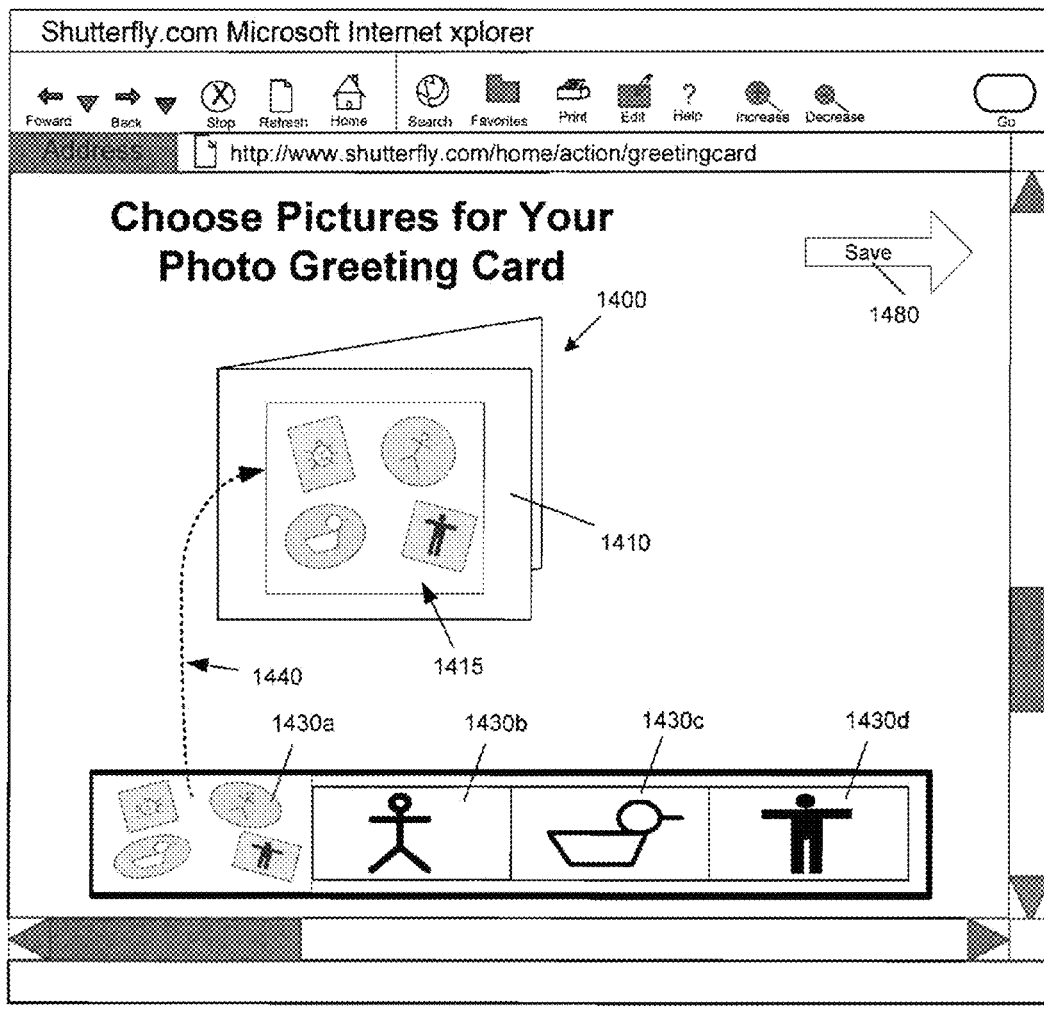
FIG. 14 illustrates the creation of a photo greeting card using a saved image collage.

The saved image collages can be used as a distinct image entity in an image-based product (step 1750). FIG. 14 illustrates the creation of a photo greeting card 1400 using a saved image collage (formed from the collage template 1200 in FIG. 2) represented by image symbol 1430a. The image symbol 1430a representing an image collage can be displayed in a film strip template together with other image symbols 1430b-1430d. The photo greeting card 1400 can be a folded card that can include a front face 1410, a back face, and two inner faces. The front face can include an image receiving area 1415. The user can drag the image symbol 1430a along the path 1440 and drop it to the image receiving area 1415 where a thumbnail image of the image collage will be displayed (step 1760). The moving of the image symbol 1430a can move the all the image and text objects in the image collage as a group to the image receiving area 1415. The image collage can be incorporated as a part (e.g. the front face) of the image-based greeting card 1400.

Figure 1:
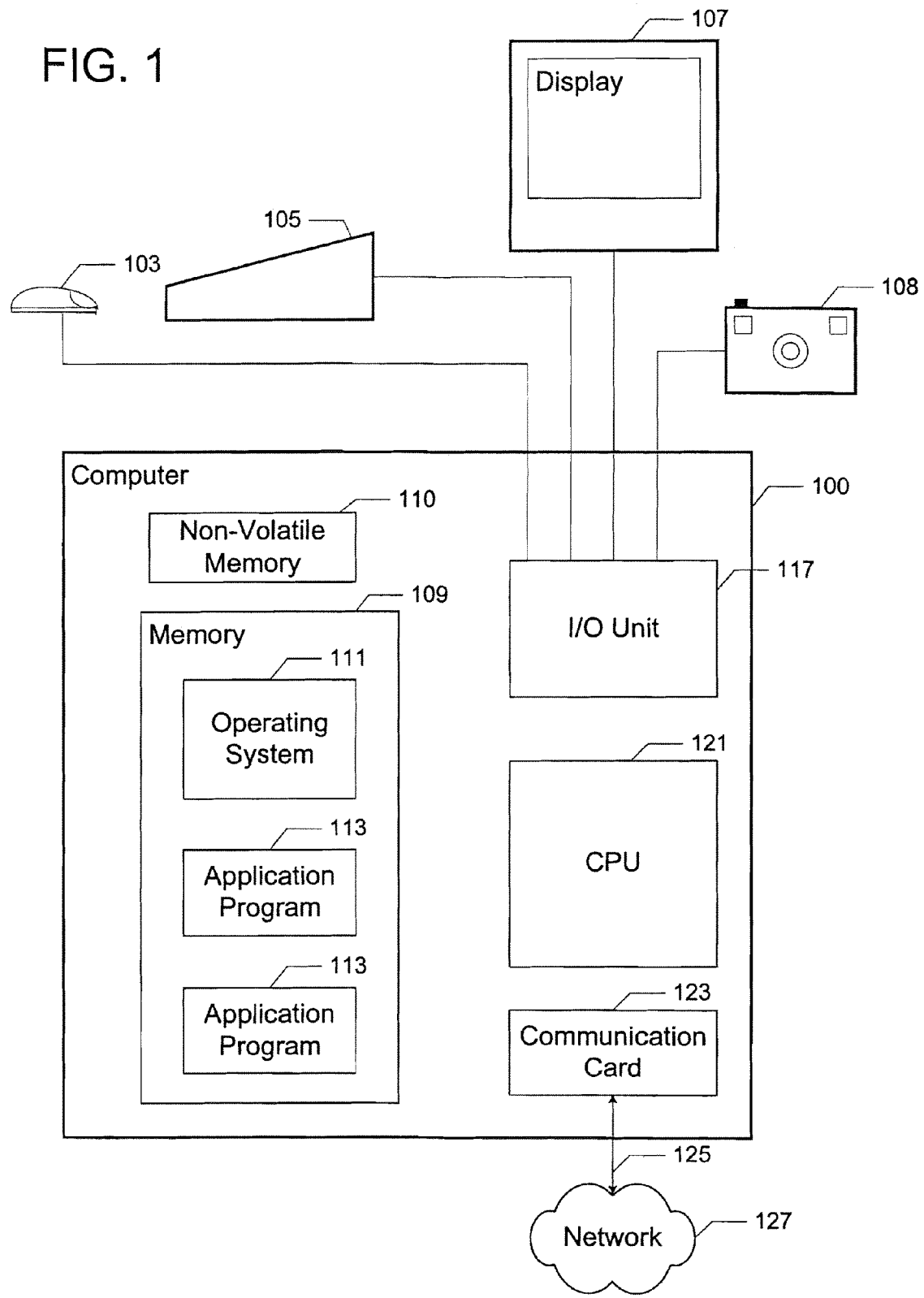
FIG. 1 is a block diagram showing a typical computer architecture.
Figure 2A:
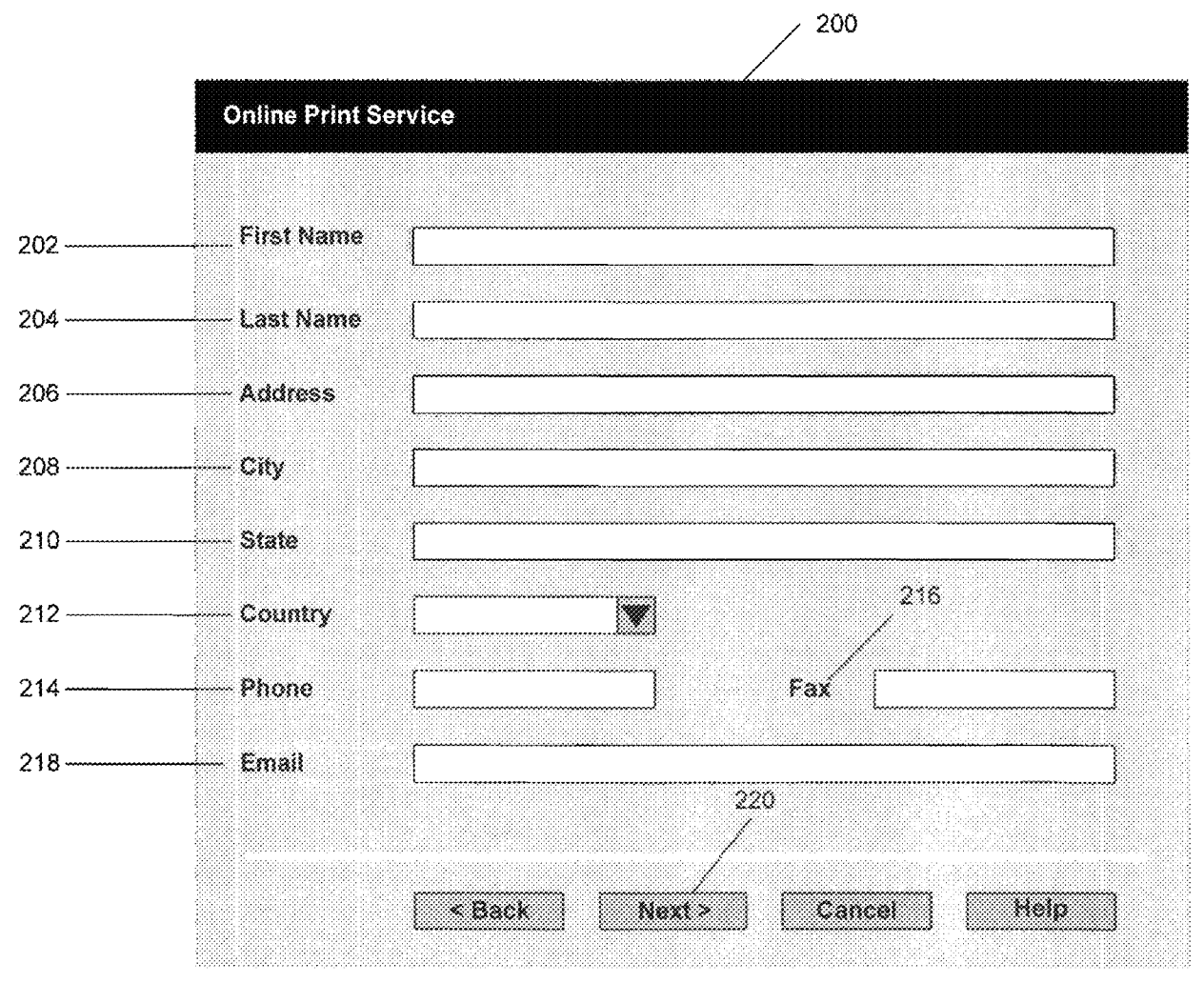
Figure 2B:
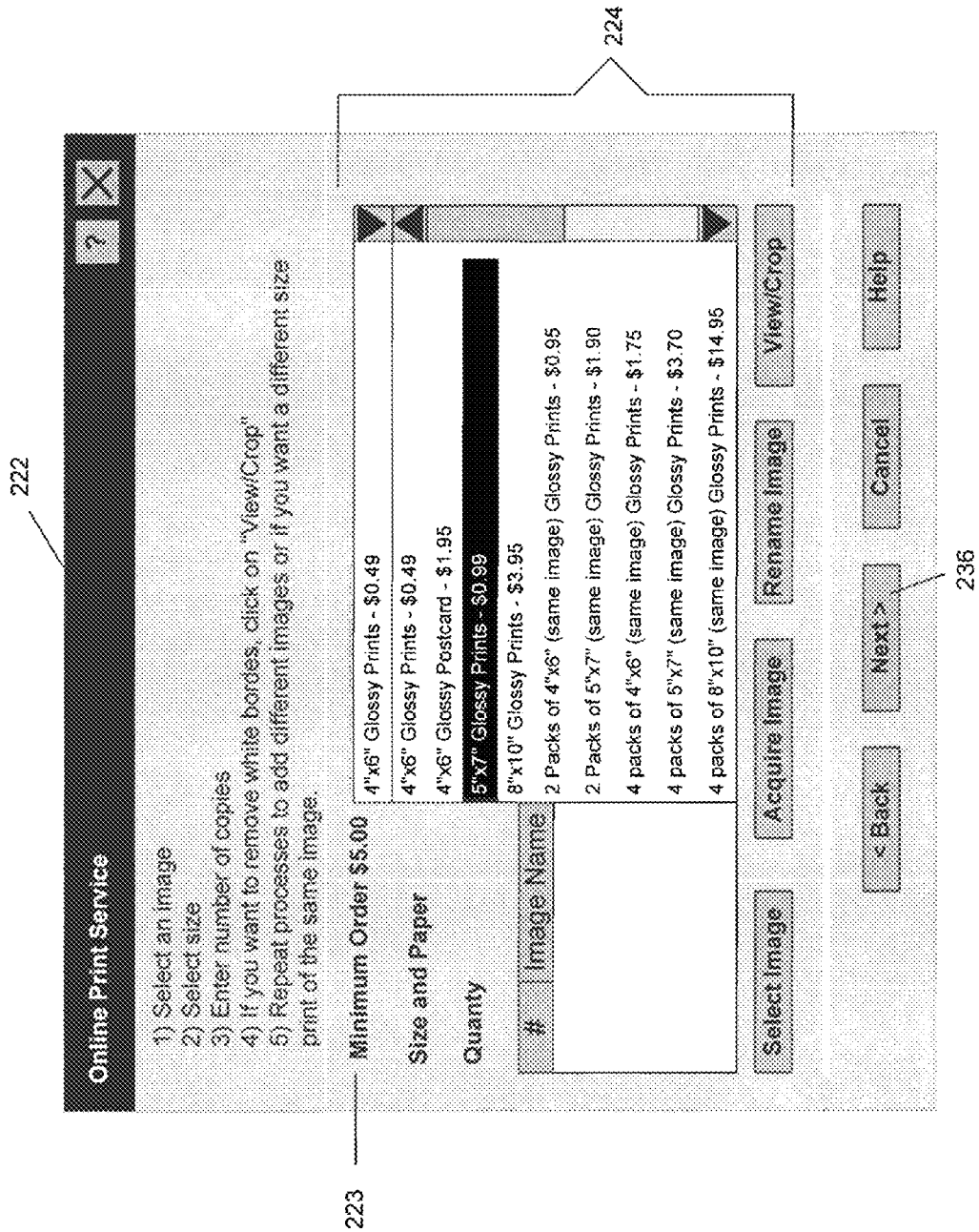
Figure 2C:
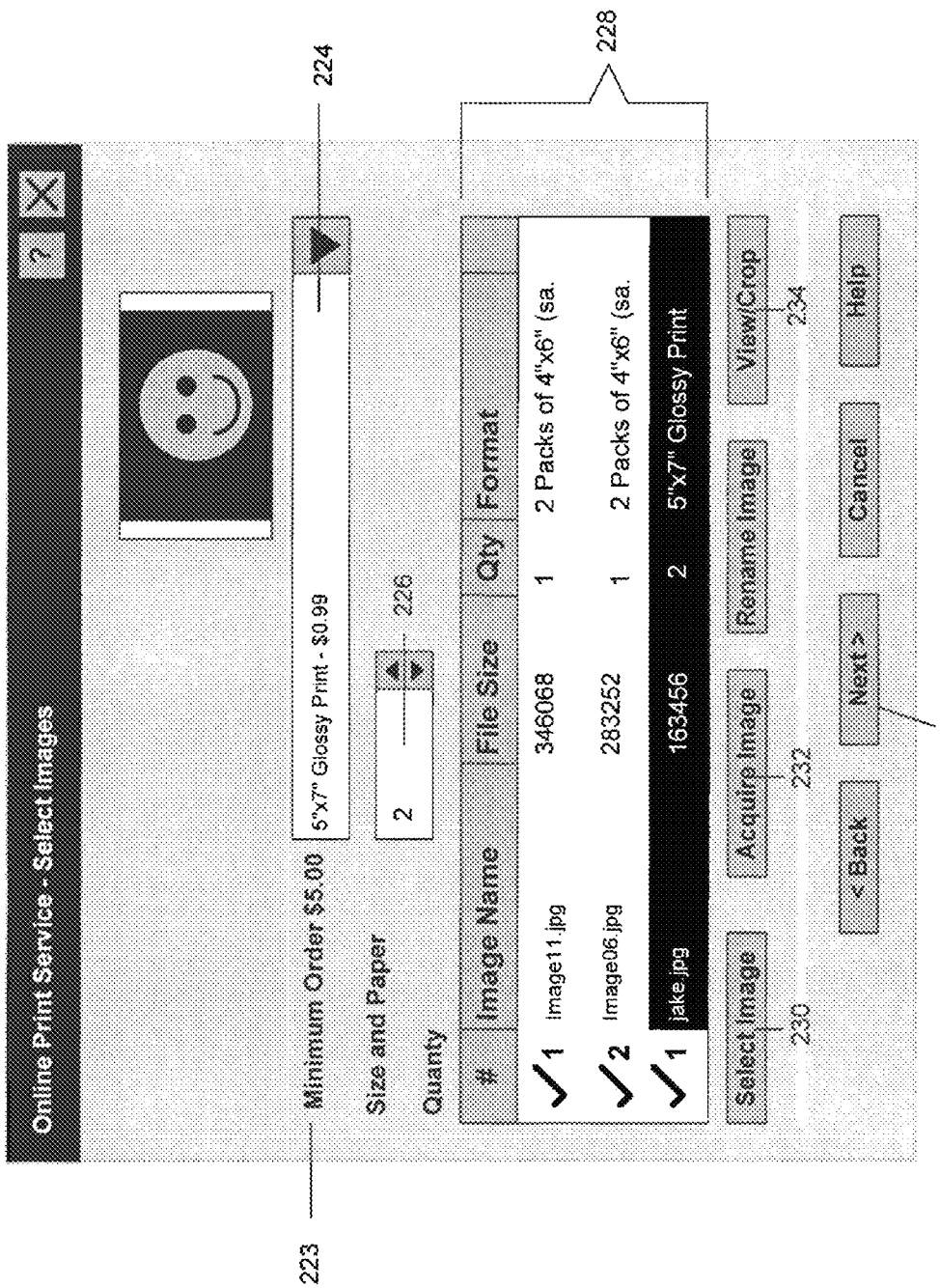
Figure 2F:
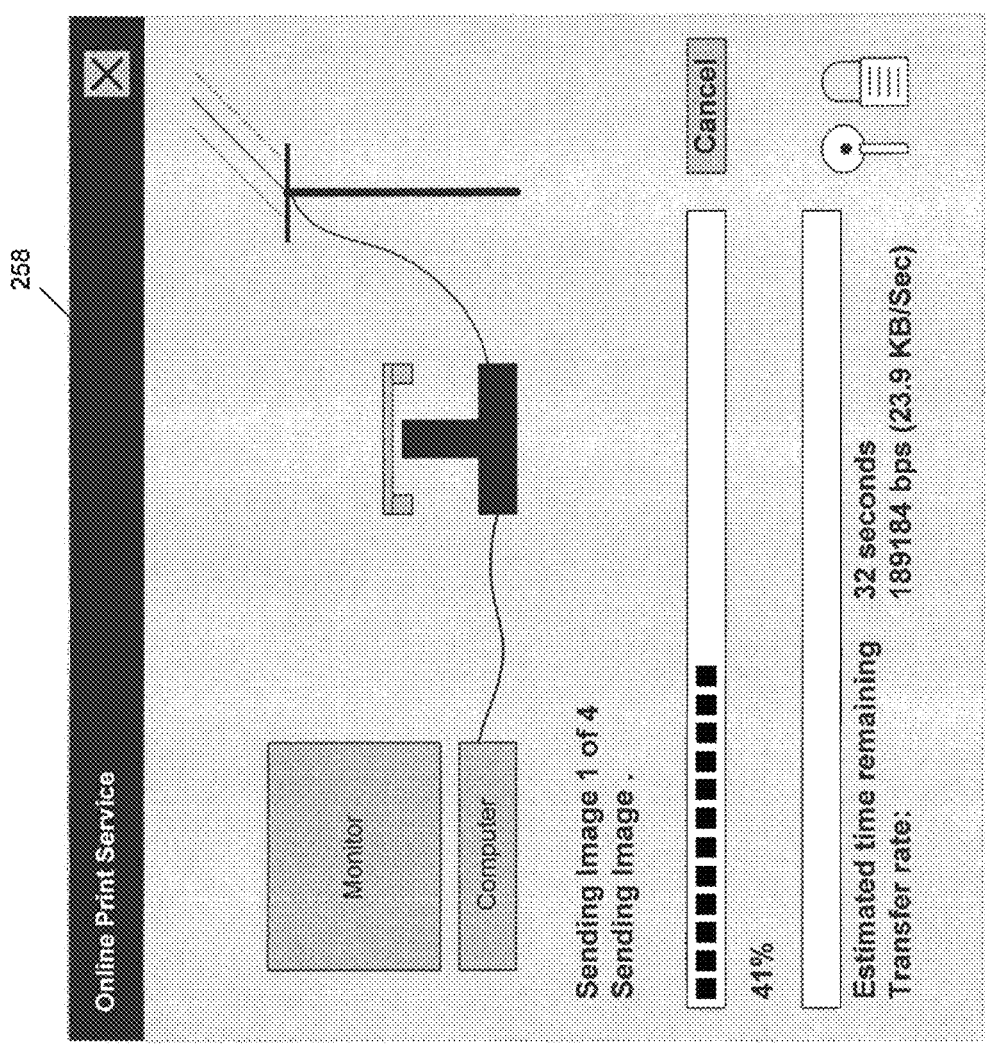
Figure 15:
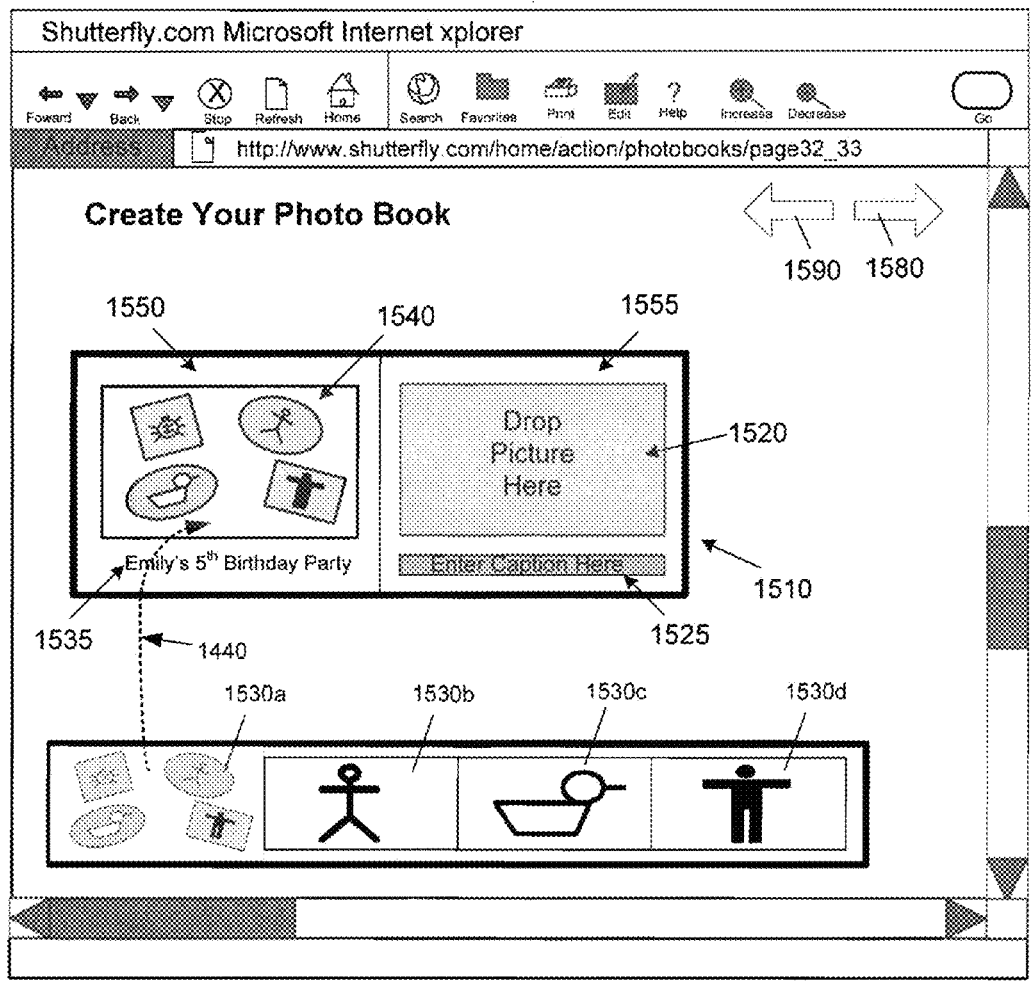
FIG. 15 illustrates the creation of a photo book using a saved image collage.

FIG. 15 illustrates the creation of two pages 1550 and 1555 in a photo book 1510 using a saved image collage formed from the collage template 1200 (as shown in FIG. 2). The pages 1550 and 1555 can include image receiving areas 1520 and 1540, and text receiving areas 1525 and 1535. The user can drag and drop the image symbol 1530a to the image receiving area 1540 (step 1760). The image symbol 1530a represents an image collage that has been rendered using a saved data structure 1300. The placement of the image symbol 1530a in the image receiving area 1520 can cause the incorporation of all objects associated with the image collage into the page 1550 in the photo book 1510. The user can also enter text caption "Emily's $5^{th}$ Birthday" in the text receiving area 1535. Other image symbols 1530b-1530d or image collages can also be selected and placed in the page 1550. When the pages 1550 and 1555 in the photo book 1510 are rendered, the image symbol 1530a can be first rendered as a standalone digital image (e.g., in bitmap, JPEG, or TIFF format), and then rendered with other image objects and text objects to form a composite image for the page 1550. Alternatively, the image objects, the text objects, and the background in the image symbol 1530a can also be directly rendered as objects in the page 1550 to form a composite image for the photo book page. Different pages of the photo book can be created or previewed by clicking the buttons 1580 and 1590 respectively.

Figure 16:
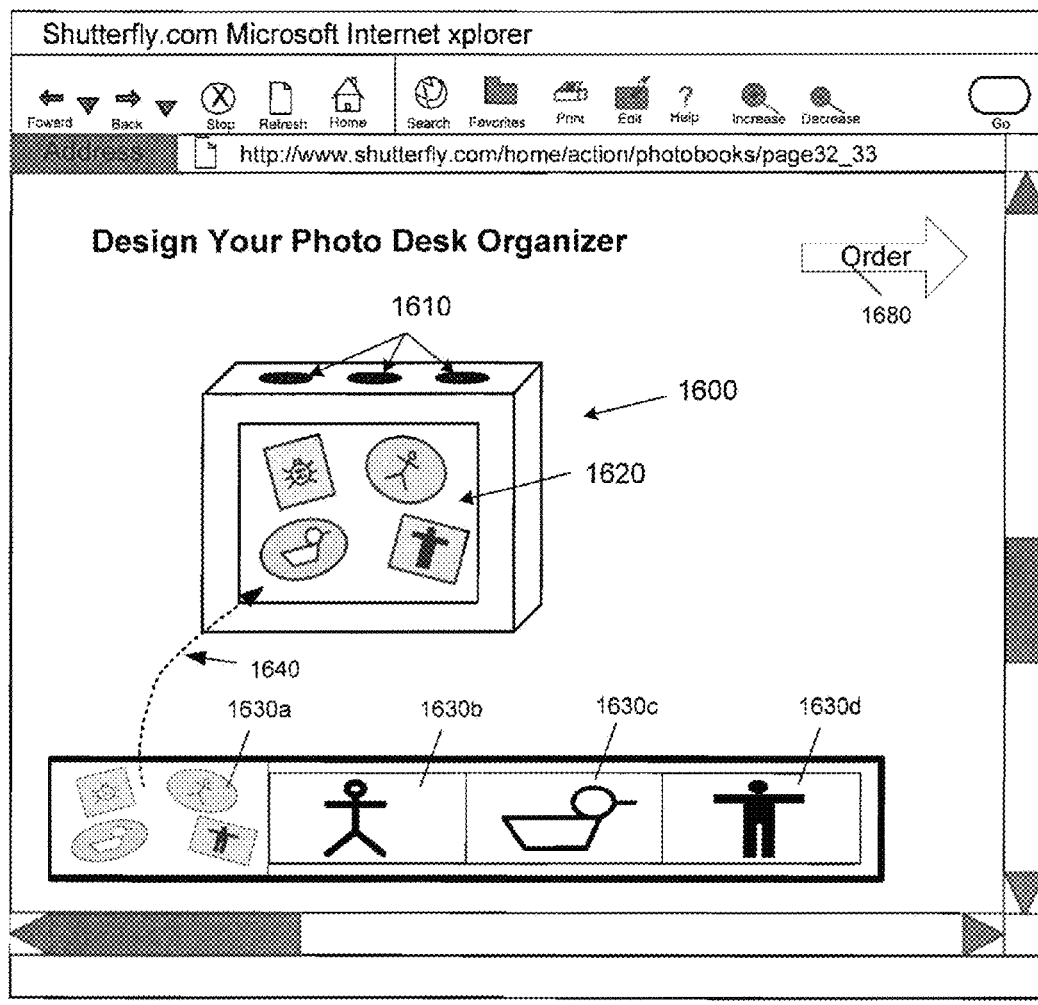
FIG. 16 illustrates the creation of a photo desk organizer using a saved image collage.

FIG. 16 illustrates the creation of a photo desk organizer 1600 using a saved image collage 1630a. The image symbol 1630a representing an image collage (formed from the collage template 1200 in FIG. 2) is displayed with other image symbols 1630b-1630d or other saved image collages in a film strip template. The photo desk organizer 1600 is a solid object that includes a front surface that can include an image receiving area 1620 and a plurality of holes 1610 for holding pens on the top surface. A user can drag and drop the image collage 1630a along the path 1640 across the user interface to drop the image symbol 1630a to the image receiving area 1620 (step 1760).

In another aspect of the present specification, the saved image collages can be displayed electronically as an intact digital image in a slideshow or wallpaper on a computer device (step 1770). The saved image collages can be shared as an intact digital image over a computer network via e-mail or as part of a photo album. The saved image collages can also be embedded in a webpage for example on a photo blog or at a community website.

The disclosed methods and techniques are applicable to many other types of image-based products, for example, post cards, note cards, photo calendars, photo mugs and coasters, photo mouse pads, posters, and banners. It is also to be noted that drag-and-drop is not the only way of selecting images to upload. Other techniques for selecting images to upload include a file browser dialog selection method. Additionally, other modalities such as cut and paste can also be used to select images for the collage templates.

The invention may be implemented in digital hardware or computer software, or a combination of both. Preferably, the invention is implemented in a computer program executing in a computer system. Such a computer system may include a processor, a data storage system, at least one input device, and an output device. Further, variations to the basic computer system are within the scope of the present invention. For example, instead of using a mouse as user input devices, a pressure-sensitive pen, digitizer or tablet may be used. The above-described software can be implemented in a high level procedural or object-oriented programming language to operate on a dedicated or embedded system. However, the programs can be implemented in assembly or machine language, if desired. In any case, the language may be a compiled or interpreted language. Each such computer program can be stored on a storage medium or device (e.g., CD-ROM, hard disk or magnetic diskette) that is readable by a general or special purpose programmable computer for configuring and operating the computer when the storage medium or device is read by the computer to perform the procedures described. The system also may be implemented as a computer-readable storage medium, configured with a computer program, where the storage medium so configured causes a computer to operate in a specific and predefined manner.

What is claimed is:

1. A computer-implemented method for manipulating images at a user interface on a computer device, comprising:
    displaying an image collection configured to display a first image at a first orientation along horizontal or vertical direction;
    displaying an image collage layout at the user interface, wherein the image collage layout comprises a first image receiving area and a second image receiving area, wherein the first image receiving area and the second image receiving area are tilted in an opposite direction from the first orientation, wherein the first image receiving area is at a second orientation tilted at an angle large than 0 and smaller than 90 degrees relative to the first orientation, wherein the second image receiving area is at a third orientation different from the first orientation, wherein the second orientation is different from the first orientation;
    allowing a user to move the first image at the first orientation in the image collection to the first image receiving area in the image collage layout;
    automatically rotating the first image from the first orientation to the second orientation when the first image is moved into the first image receiving area; and
    automatically displaying the first image at the second orientation in the first image receiving area.

2. The computer-implemented method of claim 1, wherein the image collection is configured to display a second image at the first orientation, the method further comprising:
    allowing a user to move the second image at the first orientation in the image collection to the second image receiving area in the image collage layout; and
    automatically displaying the second image at the third orientation in the second image receiving area.

3. The computer-implemented method of claim 2, further comprising:
    automatically rotating the second image from the first orientation to the third orientation when the second image is moved into the second image receiving area.

4. The computer-implemented method of claim 1, wherein the first orientation is substantially horizontal in the user interface.

5. The computer-implemented method of claim 1, wherein the first image receiving area and the second image receiving area are tilted at substantially a same tilt angle relative to the first orientation.

6. The computer-implemented method of claim 1, wherein the first image receiving area has an oval shape.

7. The computer-implemented method of claim 1, further comprising:
    a control configured to be actuated by a user to select the image collage layout among a plurality of image collage layouts.

8. The computer-implemented method of claim 1, wherein the image collage layout is configured to receive text from a user.

9. The computer-implemented method of claim 1, wherein the step of allowing a user to move the first image at the first orientation in the image collection to the first image receiving area in the image collage layout comprises allowing a user to drag the first image and drop the first image into the first image receiving in the user interface.

10. The computer-implemented method of claim 1, wherein the user interface is a web user interface executed by a computer device in communication with a remote server, wherein the placement of the first image in the first image area is communicated to the remote server.

11. A computer-implemented method for manipulating images at a user interface on a computer device, comprising:
    displaying an image collection configured to display a first image at a first orientation along horizontal or vertical direction;
    displaying an image collage layout at the user interface, wherein the image collage layout comprises a first image receiving area that is at a second orientation tilted at an angle large than 0 and smaller than 90 degrees relative to the first orientation, wherein the image collage layout comprises a second image receiving area at a third orientation different that is from the first orientation, wherein the first image receiving area and the second image receiving area are tilted in a same direction from the first orientation;
    allowing a user to move the first image at the first orientation in the image collection to the first image receiving area in the image collage layout;
    automatically rotating the first image from the first orientation to the second orientation; and
    automatically displaying the first image at the second orientation in the first image receiving area.

12. The computer-implemented method of claim 11, wherein the image collection is configured to display a second image at the first orientation, the method further comprising:
    allowing a user to move the second image at the first orientation in the image collection to the second image receiving area in the image collage layout;
    automatically rotating the second image from the first orientation to the third orientation; and
    automatically displaying the second image at the third orientation in the second image receiving area.

13. The computer-implemented method of claim 11, wherein the first image receiving area has an oval shape.

14. The computer-implemented method of claim 11, wherein the image collage layout is configured to receive text from a user.

15. The computer-implemented method of claim 11, wherein the user interface is a web user interface executed by a computer device in communication with a remote server, wherein the placement of the first image in the first image area is communicated to the remote server.

16. A computer program product comprising a non-transitory computer useable medium having computer readable program code functions embedded in said medium for causing a computer to:
    display, at a user interface on a computer device, an image collection configured to display a first image at a first orientation along horizontal or vertical direction;
    display an image collage layout at the user interface, wherein the image collage layout comprises a first image receiving area that is at a second orientation tilted at an angle large than 0 and smaller than 90 degrees relative to the first orientation, wherein the image collage layout comprises a second image receiving area at a third orientation that is different from the first orientation, wherein the first image receiving area and the second image receiving area are tilted in an opposite direction from the first orientation;
    allow a user to move the first image at the first orientation in the image collection to the first image receiving area in the image collage layout;
    automatically rotate the first image from the first orientation to the second orientation; and
    automatically display the first image at the second orientation in the first image receiving area.

* * * * *